(12) United States Patent
Parsons

(10) Patent No.: US 6,783,187 B2
(45) Date of Patent: Aug. 31, 2004

(54) VECTOR NEUTRAL TRUCK

(76) Inventor: Michael S. Parsons, 578 Paris Street, Sudbury, Ontario (CA), P3E 3B4

(*) Notice: Subject to any disclaimer, the term of this patent is extended or adjusted under 35 U.S.C. 154(b) by 0 days.

(21) Appl. No.: 10/628,354

(22) Filed: Jul. 29, 2003

(65) Prior Publication Data

US 2004/0080206 A1 Apr. 29, 2004

Related U.S. Application Data

(60) Provisional application No. 60/421,850, filed on Oct. 29, 2002.

(51) Int. Cl.$^7$ .............................. B60P 1/04; B60N 2/005; H04N 7/18
(52) U.S. Cl. ........................ 298/22 R; 701/28; 348/118
(58) Field of Search ......................... 298/7, 17.5, 17.6, 298/22 R; 296/190.08; 340/435, 436, 437, 438, 903, 937; 701/1, 23, 28, 36; 348/113, 114, 115, 116, 117, 118, 119, 120, 143, 148, 149, 159, 169

(56) References Cited

U.S. PATENT DOCUMENTS

| | | | | |
|---|---|---|---|---|
| 3,557,304 A | * | 1/1971 | Rue et al. ..................... | 348/114 |
| 3,704,040 A | * | 11/1972 | Davis et al. ............... | 298/17 R |
| 3,720,446 A | * | 3/1973 | Kelley ....................... | 298/22 R |
| 4,037,250 A | * | 7/1977 | McGahan et al. .......... | 348/159 |
| 4,080,629 A | * | 3/1978 | Hammond et al. ......... | 348/373 |
| 4,141,591 A | | 2/1979 | Spicer | |
| 4,214,266 A | * | 7/1980 | Myers ........................ | 348/140 |
| 4,700,223 A | * | 10/1987 | Shoutaro et al. ............ | 348/148 |
| 4,968,097 A | * | 11/1990 | Thomas et al. ........... | 298/22 R |
| 4,994,971 A | * | 2/1991 | Poelstra ........................ | 701/35 |
| 5,273,317 A | * | 12/1993 | Kunz et al. .................. | 280/787 |
| 5,612,883 A | * | 3/1997 | Shaffer et al. .............. | 701/300 |

(List continued on next page.)

OTHER PUBLICATIONS

Cummins Power Generation: *Specification Sheet—Generator Set Diesel—2700hp*; especially http://www.cumminspower.com/library/specsheets/diesel_5 Ohz/DQKB_50Hz.pdf; Oct. 2002.

Goodyear: *Off–Roads Tires—Haulage Truck Tires*: especially http://www.goodyearotr.com/pdf/haulage.pdf; Oct. 2002.

Hutnyak Consulting: *Haul Truck Photos*; especially http://hutnyak.com/HaulTrucks.htm; Oct. 2002.

Liebherr: *Technical Description Mining Truck T 282*; especially http://www.1hb.liebherr.de/pdf_us/T282–GB–US–TB.pdf; Oct. 2002.

Terex: *TR–60 Off–Highway Truck—Specification Brochure*; Form No 782, Aug. 1998.

Vince's Big Trucks: *Information and pictures of large haulage trucks*; especially http://www.vlewis.net/page17a.html; Oct. 2002.

*Primary Examiner*—D. Glenn Dayoan
*Assistant Examiner*—Paul Chenevert
(74) *Attorney, Agent, or Firm*—Marvin S. Towsend

(57) ABSTRACT

A self-propelled vehicle includes a main frame which has a main-frame longitudinal axis. First and second powered wheel/suspension assemblies are connected to the main frame near respective first and second ends of the main frame. A steering system includes a hand-held steering controller, in an operator's cab, which turns the first and second wheel/suspension assemblies simultaneously and in opposite directions. A dump box and hydraulic dump box hoist mechanism are supported by the main frame. The operator's cab is supported along a transverse cab axis, perpendicular to the main-frame longitudinal axis, at a fixed longitudinal position along the main frame. A television-based pathway monitoring system includes a camera cluster and multiple viewing screens in the operator's cab. The multiple viewing screens are positioned in the operator's cab such that an operator need not change one's directional orientation when the vehicle moves in opposite directions.

11 Claims, 19 Drawing Sheets

U.S. PATENT DOCUMENTS

| | | | | |
|---|---|---|---|---|
| 5,680,123 A | * | 10/1997 | Lee | 340/937 |
| 5,793,308 A | * | 8/1998 | Rosinski et al. | 340/903 |
| 6,022,068 A | * | 2/2000 | D'Amico | 296/183.2 |
| 6,086,076 A | * | 7/2000 | Prem et al. | 280/124.111 |
| 6,108,031 A | * | 8/2000 | King et al. | 348/118 |
| 6,578,925 B1 | * | 6/2003 | Baker et al. | 298/17.6 |
| 6,633,800 B1 | * | 10/2003 | Ward et al. | 701/2 |
| 2003/0137586 A1 | * | 7/2003 | Lewellen | 348/148 |
| 2004/0080206 A1 | * | 4/2004 | Parsons | 298/22 R |

\* cited by examiner

LIEBHERR
T282

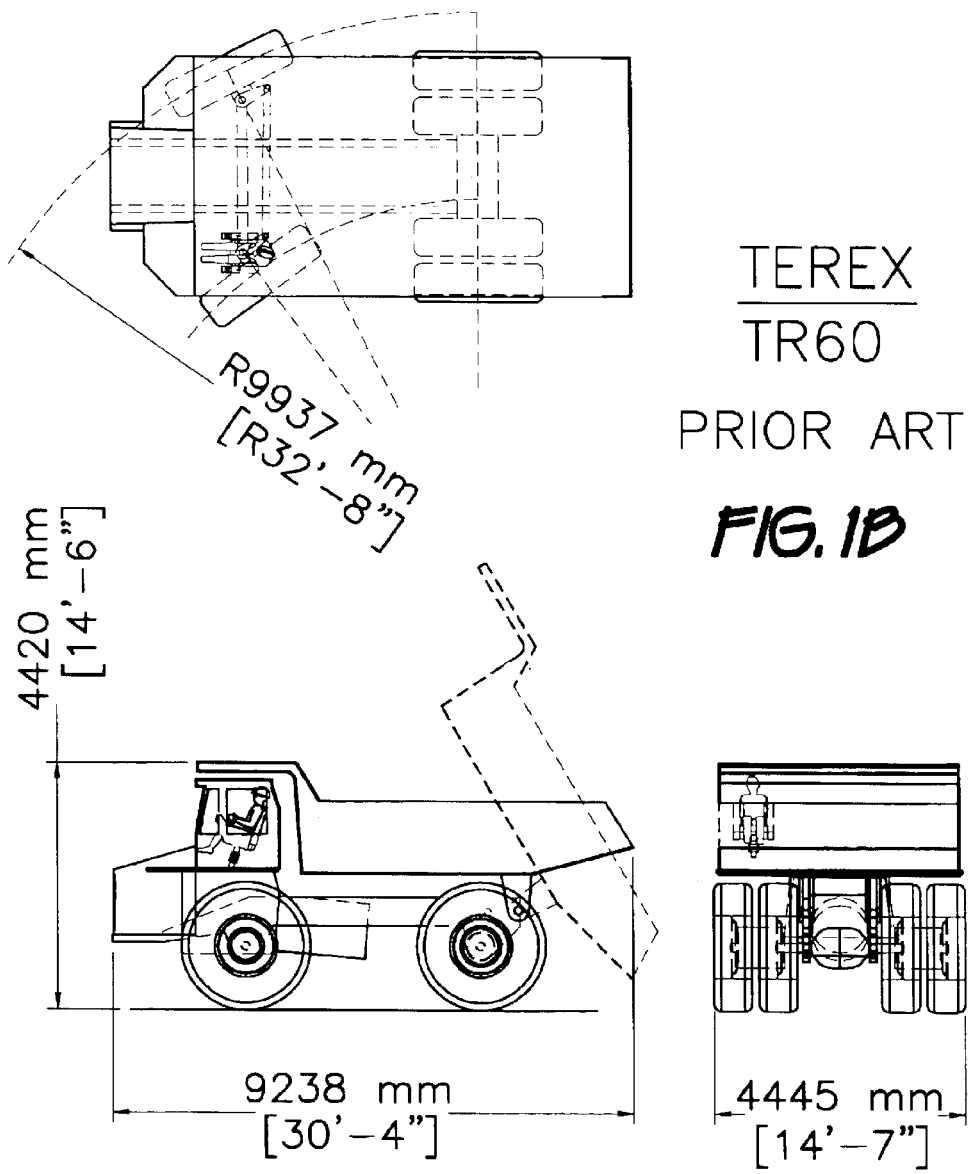

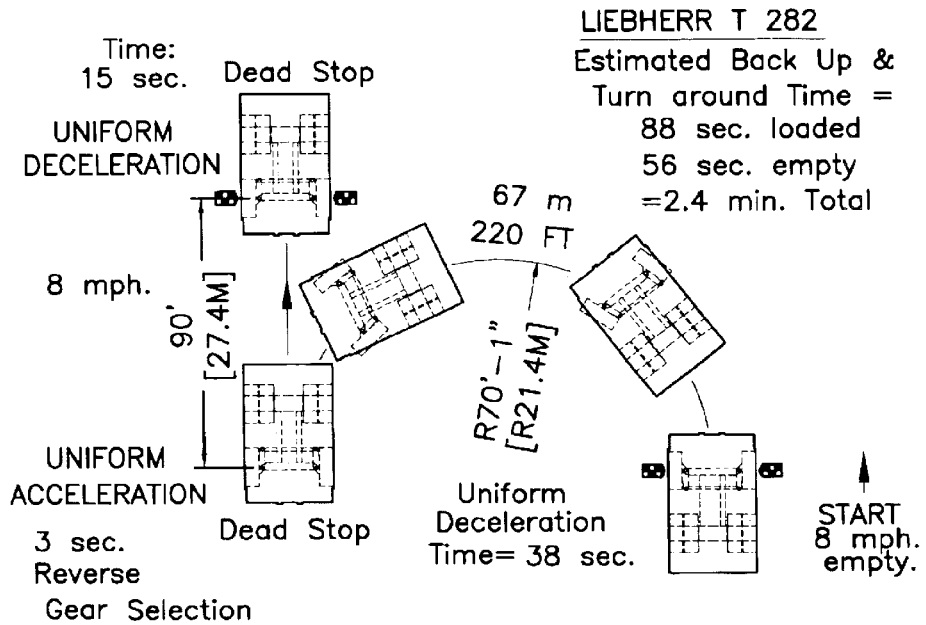
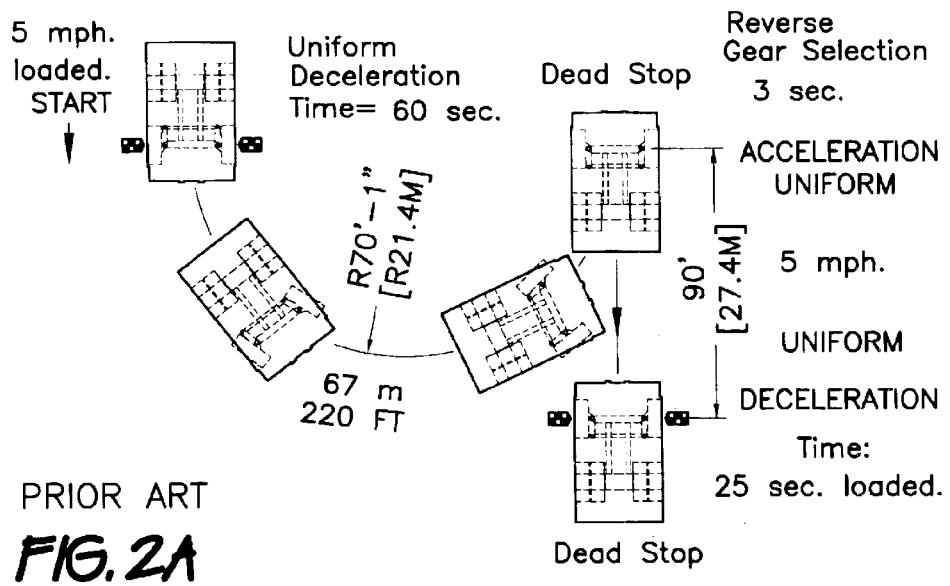
PRIOR ART
FIG. 2A

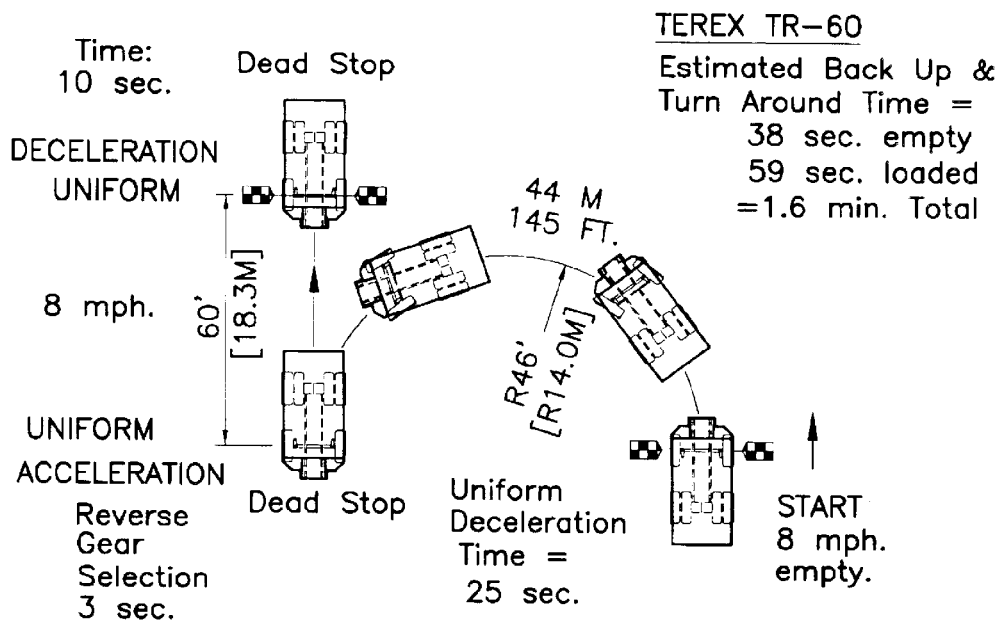
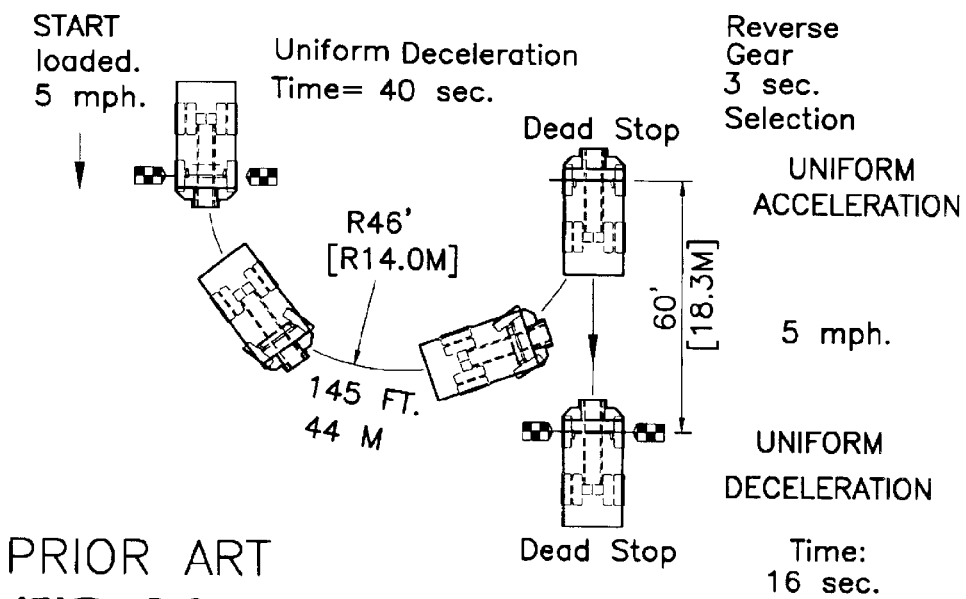
PRIOR ART
FIG. 2B

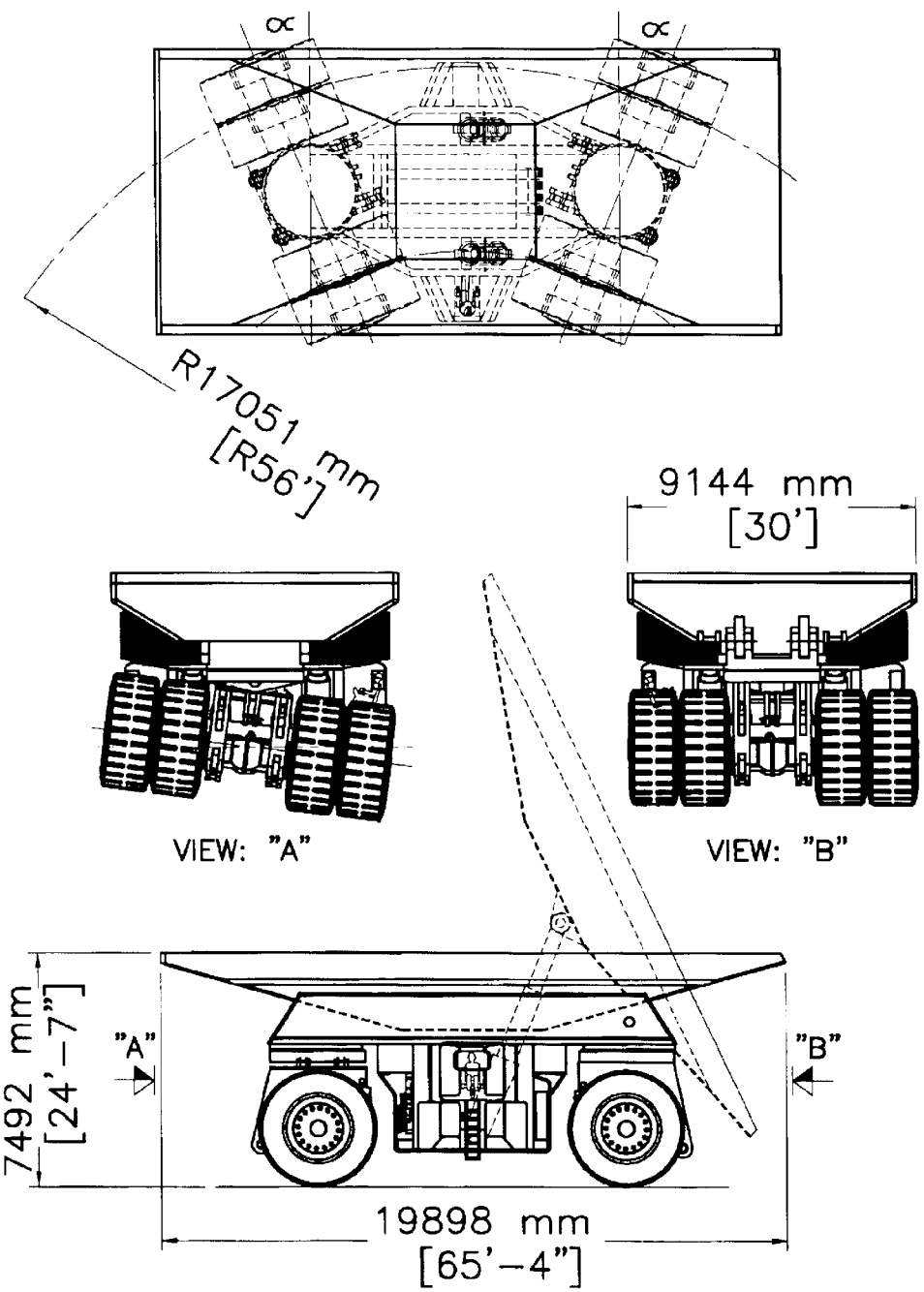
VECTOR NEUTRAL 400  FIG. 3A

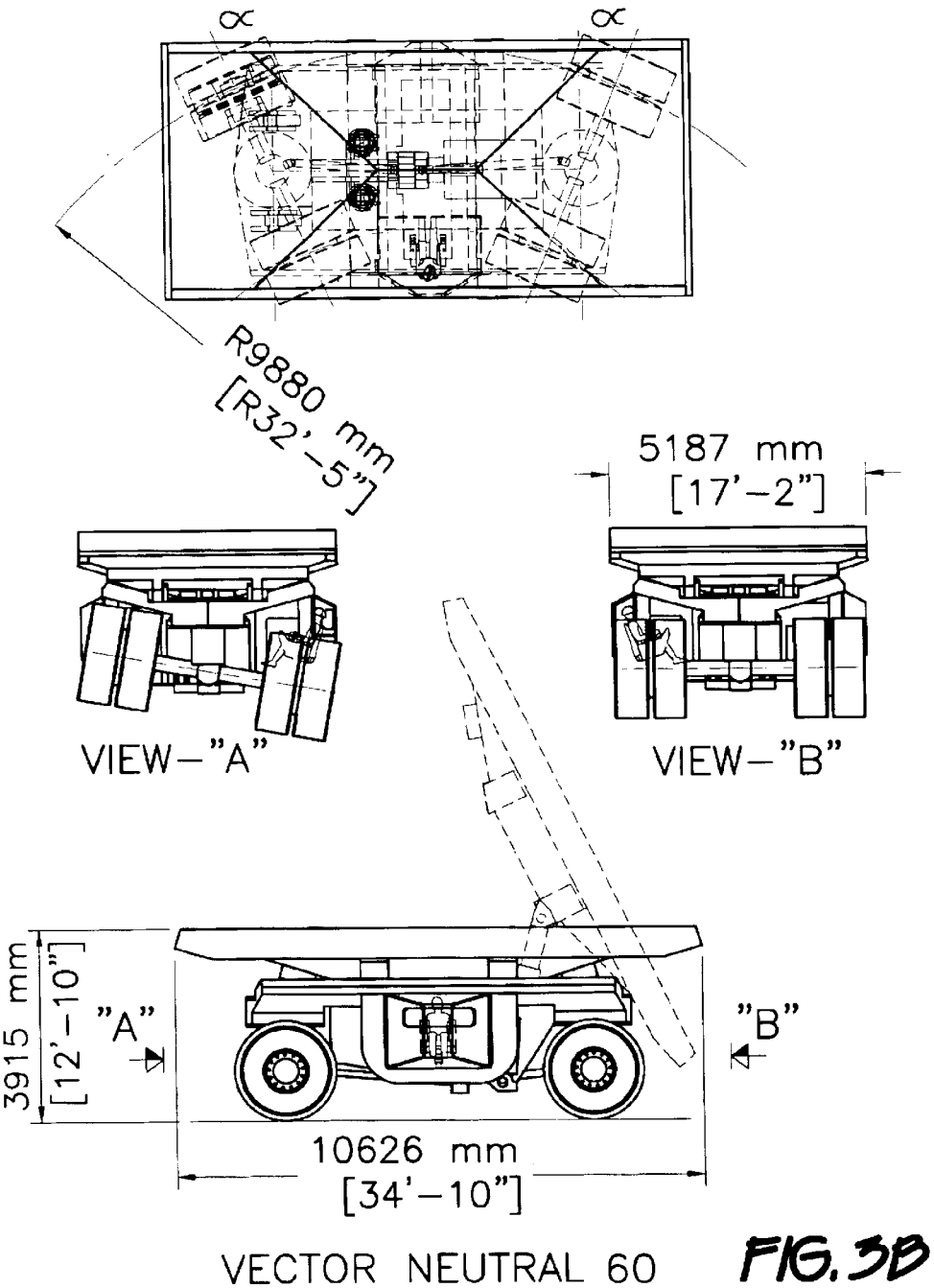
VECTOR NEUTRAL 60      FIG.3B

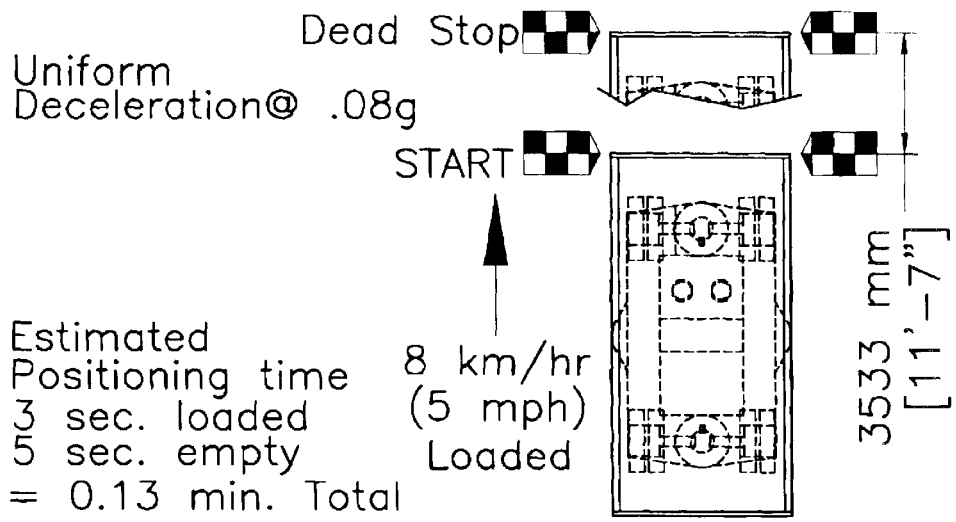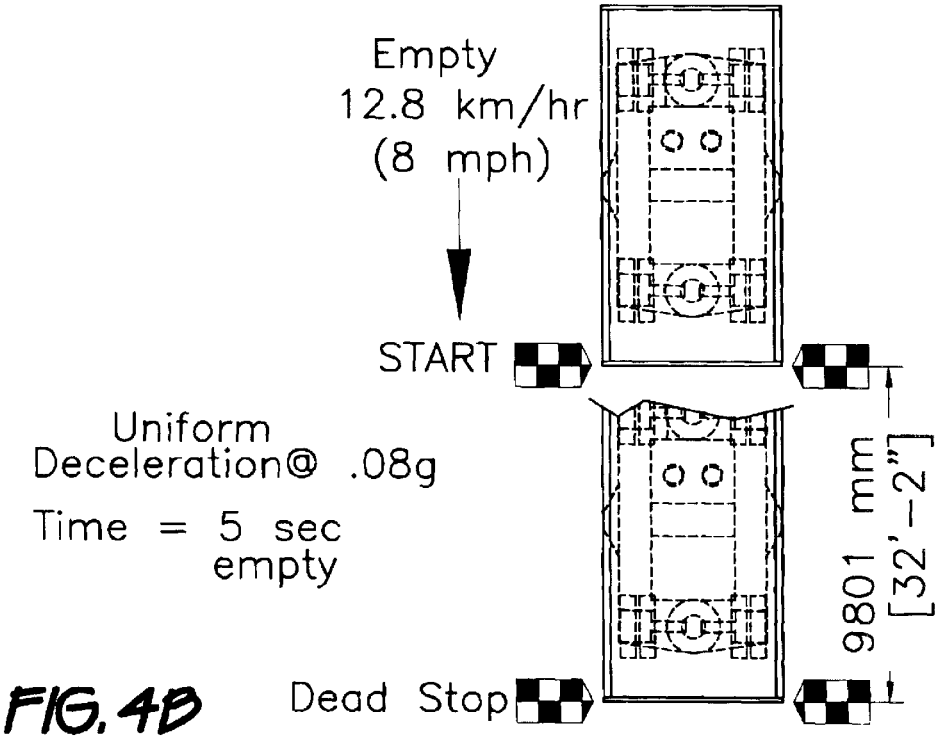
FIG. 4B

VECTOR NEUTRAL TRUCK

CROSS-REFERENCE TO RELATED APPLICATION

This application claims priority based upon my Provisional Application Serial No. 60/421,850, filed Oct. 29, 2002.

BACKGROUND OF THE INVENTION

1. Field of the Invention

The present invention relates generally to trucks, and, more particularly, to haulage/dump trucks that are used for large capacity applications, such as at surface mines or quarries.

2. Description of the Prior Art

Before self-propelled haulage vehicles, the transport of aggregates, ore, waste and fill, was performed by a mule or horse drawn two-wheeled cart, led by a driver using a short harness. Through repetition, the animals quite often learned to make the journey to and from the load and dump locations on their own, without the need of a driver. Turning the cart around for dumping, and positioning the cart for loading however, still required a driver's attention.

The tractive effort of the horse and mule was replaced by the internal combustion engine driving the rear axle of the haulage/dump truck. The driver uses a steerable front axle to guide the travel to and from the load and dump areas. While the performance advantages of speed and payload have grown with the development of larger and larger engines, transmissions, and tires, the basic design of the haulage vehicle remains the same. Material is loaded into a box largely supported by a single axle that is driven by a power plant, and guided by a driver through a steering front axle. The haulage cycle also remains the same as it was before the advent of mechanical power.

More specifically, a conventional haulage cycle can be described as follows. The vehicle backs into its loading position, travels to the dump area where it turns around and dumps its load, then travels back to the loading area where it again turns around and is ready for the next cycle. More specifically, conventional large haulage vehicles have grown into behemoths with payloads of hundreds of tons driven by power plants of thousands of horsepower (see PRIOR ART FIG. 1). Yet, such large haulage vehicles still follow the path of the horse drawn cart. They are loaded, travel to the dump area, turn around and dump, then return to the loading area, turn around and position themselves for loading, ready for the cycle to repeat. Be it overburden and ore at a mine site, aggregate and fill for road building, or one of the many other applications of the large capacity haulage trucks, the haulage cycle remains the same. There is no escaping the need to turn around every time a haulage cycle is completed. Be it a long turn-around that brings the vehicle directly under a loading mechanism, or the more common, come to a complete stop, then reverse into position to be loaded or dump, there is no escaping the absolute fact that the truck must make two 180 degree turn-arounds per cycle. In addition to making a 360-degree turn, conventional haulage trucks must also reverse into position for dumping, and depending on the loading procedure, must also stop and reverse into position for loading.

In view of the above, it would be desirable if a haulage vehicle were provided that does not need to utilize a conventional haulage cycle as described above.

A further analysis of haulage cycles for two conventional haulage trucks is provided below, with reference to PRIOR ART FIGS. 1 and 2. The first conventional truck is a 60-ton capacity mechanical-drive class, truck as represented by the Terex TR-60 (Terex, 1998). The second conventional truck is a 400-ton capacity electric drive truck as illustrated by the Liebherr T282 (Liebherr, 2002). Both conventional haulage trucks have the following common design. A rear axle with four tires is driven by a power plant either through a mechanical transmission or through electric wheel motors. The front axle, made up of two independently suspended tires and wheels largely supports the power plant, and is steered by a driver sitting above the axle facing forward. The payload is deposited into a dump box that is behind the driver and that is then hinged to discharge the load. Since the orientation of the driver changes and reverses direction as the truck goes through the conventional haulage cycle, such as conventional haulage truck is vector sensitive.

The TR-60 (Terex, 1998) has a 650 hp engine, located above the front axle, driving a single rear axle through a mechanical transmission. Four tires on the drive axle carry 52% of the vehicle weight when the vehicle is empty, and 66% of the vehicle weight when it is fully loaded. The drive axle is connected to the main frame by a variable rate nitrogen/oil cylinder, with "A-frame" linkage and lateral stabilizer bar (Terex, 1998). The front axle is comprised of steerable King-pin type suspensions, and steerable rubber-tired wheels that combined carry 48% of the vehicle weight when the vehicle is empty, and 34% of the vehicle weight when the vehicle is fully loaded. Overall dimensions for the TR-60 are (as shown in PRIOR ART FIG. 1B): length is 9.2 m (30'-4"); width is 4.4 m (14'-6"); height is 4.4 m (14'-6") with a minimum outside turning radius of approximately 9.9 m (32'-8"). The driver sits above one of the front wheels facing forward. The payload is loaded into a dump bucket with a heaped capacity of 35 cubic meters (46 yrd$^3$) that is hinged on the rear frame.

PRIOR ART FIG. 2A shows the distance and estimated time required to make two 180 degree turns, one empty and one loaded, and back into a loading and dumping position for the Liebherr T282. It is assumed that the turn maneuver starts at a speed of 12.8 km/h (8 mph) empty and 8 km/h (5 mph) loaded, and uniformly decelerates to a complete stop after 180 degrees of turn, then reverses and uniformly accelerates to 12.8 km/h (8 mph) empty and 8 km/h (5 mph) before uniformly decelerating to a dead stop. The calculated time to complete this maneuver is the estimated time a TR-60 spends per haul cycle turning around and backing up, which is 1.6 minutes.

With respect to the Liebherr T282 (Liebherr, 2002), this haulage truck has a 2700 hp engine, located over the front axle, driving a single rear axle through an electrical drive system. The rear drive axle is connected to the main frame with a three bar linkage that is suspended on nitrogen/oil cylinders (Liebherr, 2002). Four tires on the drive axle carry 55% of the vehicle weight when the vehicle is empty, and 66% of the vehicle weight when the vehicle is fully loaded. The front axle is compromised of two steerable, independently suspended King-pin type structures that combined carry 45% of the vehicle weight when the vehicle is empty, and 34% of the vehicle weight when it is fully loaded. Overall dimensions for the Liebherr T282 are (as shown in PRIOR ART FIG. 1A): length is 14.8 m (48'-10"); width is 8.8 m (28'-7"); height is 7.5 m (24'-7") with an outside estimated turning radius of 16.2 m (53'-1"). The driver sits above one of the front wheels facing forward. The payload is loaded into a dump bucket with a heaped capacity of 183 cubic meters (240 yrd$^3$), that is hinged on the main frame. The Liebherr T282 dump truck is another vector sensitive haulage truck.

PRIOR ART FIG. 2B shows the distance and estimated time required to make two 180 degree turns, one empty and one loaded, and back into a loading and dumping position, for the Terex TR-60. It is assumed that the turn maneuver starts at a speed of 12.8 km/h (8 mph) empty and 8 km/h (5 mph) loaded, and uniformly decelerates to a complete stop after 180 degrees of turn, then reverses and uniformly accelerates to 12.8 km/h (8 mph) empty and 8 km/hr (5 mph) before uniformly decelerating to a dead stop. The calculated time to complete this maneuver is the estimated time a T282 spends per haul cycle turning around and backing up, which is 2.4 minutes.

As stated above, both the Liebherr T282 dump truck and the Terex TR-60 dump truck provide a vector sensitive haulage/dump truck. That is, the orientation of the driver changes during the haulage cycle. In contrast, it is contemplated by the inventor herein that a vector neutral truck is desired. That is, with a vector neutral truck, the orientation of the driver remains constant and the haulage/dump truck moves through its respective conventional haulage cycle.

In the prior art, a bi-directional dump truck is disclosed in U.S. Pat. No. 4,141,591. More specifically, U.S. Pat. No. 4,141,591 discloses a bidirectional dump truck that includes an operator's cab whose position is translated longitudinally along the longitudinal axis of the truck when the direction of motion of the truck is reversed. One means for translating the operator's cab longitudinally is by a swingable boom which is pivoted on the vehicle frame. Another means for translating the operator's cab longitudinally is by providing a longitudinal beam upon which the operator's cab can move to the front or the rear of the truck. As can be ascertained from a reading of U.S. Pat. No. 4,141,591, a large number of structural components must be provided and considerable time and effort must be expending during longitudinal translation an operator's cab to the front or the rear of the truck. To avoid such complexities in structure and construction, and to avoid the expenditure of time required to translate an operator's cab longitudinally along the longitudinal axis of the truck, it would be desirable if a bi-directional truck were provided which does not longitudinally translate an operator's cab from the front to the back of the truck.

Also, with U.S. Pat. No. 4,141,591, it is noted that two separate and distinct steering wheels are provided to accommodate a driver who selectively drives the truck in a forward or rearward direction. With U.S. Pat. No. 4,141,591 an unconventional haulage cycle is provided wherein the bi-directional truck moves forward and backward without needing to carry out a plurality of stops, reverses, and turns. The driver is provided with a swivel chair to position himself in front of either of the two steering wheels located at opposite sides of the operator's cab in order to face in either a front direction parallel to the longitudinal axis of the truck or a rear direction parallel to the longitudinal axis of the truck. Even though this truck carries out an unconventional haulage cycle, without needing to carry out a plurality of stops, reverses, and turns, the driver himself changes his orientation, depending upon the direction in which the truck travel. In this respect, the truck in U.S. Pat. No. 4,141,591 is also a vector sensitive truck. With this in mind, it would be desirable if a haulage/dump truck were provided in which the orientation of the driver remains constant when the haulage/dump truck moves through its respective unconventional haulage cycle without carrying out a plurality of stops, reverses, and turns.

Still other features would be desirable in a vector neutral truck. For example, an open-pit mine could have a roadway that descends clockwise. Alternatively, an open-pit mine could have a roadway that descends counter-clockwise. In this respect, an operator may choose to face into the center, or away from the mine for various operational reasons. This is similar to having a right-hand or left-hand drive automobile. To provide this flexibility to an operator, it would be desirable if a haulage/dump truck were provided in which an operator's cab could be selectively positioned along a transverse axis that is perpendicular to the longitudinal axis of the truck. In this way, the operator's cab could be positioned on either the left side or the right side of the truck as desired.

With conventional haulage/dump trucks, there are invariably a number of "blind spots" which hinder the view of the operator of the haulage/dump truck during operation of the vehicle. Although mirrors may be employed to reduce the number and extent of some of such "blind spots", the use of a plurality of mirrors requires the operator to periodically shift one's attention from one mirror to another. Consequently, the use of a plurality of mirrors may distract the operator from full attention to the driving of the vehicle. In this respect, it would be desirable if a haulage/dump truck were provided which reduces "blind spots" without requiring the use of a plurality of mirrors.

With respect to conventional haulage/dump trucks, a wide variety of motors (engines), transmissions (both mechanical and hydraulic), suspensions, wheel assemblies, steering systems, braking systems, and dumping systems are visible or well known. In this respect, it would be desirable to provide a vector neutral truck that utilizes such well known motors (engines), transmissions, suspensions, wheel assemblies, steering systems, braking systems, and dumping systems.

As stated above, providing a haulage vehicle that does not need to utilize a conventional haulage cycle would be desirable for its savings in time and energy in carrying out hauling and dumping functions. Additional benefits would be realized by not using a conventional haulage cycle. Fewer brake and steering applications would result in reduced wear on the entire drive train, including tires. Moreover, less road maintenance would be required because of the elimination of the turn-around area. In addition, by not employing a conventional haulage cycle, there would be a relative ease and simplicity of adapting remote and automated vehicle control.

As stated above, it would be desirable to provide a haulage vehicle that does not need to utilize a conventional haulage cycle. To further elaborate, it would be desirable to provide a new haulage/dump truck that employs an unconventional haulage cycle, whereby the new haulage/dump truck provides the following benefits over a haulage/dump truck that employs a conventional haulage cycle: travels a shorter distance from the load station to the dump station, employs fewer brake and steering actuations, is easier to automate, and is easier to adapt for remote control operation.

As discussed above with respect to the Liebherr T282 dump truck and the Terex TR-60 dump truck, relative weight distribution on the front wheels/tires and the rear wheels/tires varies depending upon whether the respective dump truck is carrying a load or is not carrying a load. Moreover, the relative weight distribution between the front and rear wheels/tires is not 50%—50% whether the respective truck is carrying a load or not carrying a load. In this respect, to provide more even wear and tear and to provide greater stability for a haulage/dump truck, it would be desirable to provide a new haulage/dump truck that provides a substantially 50%—50% relative weight distribution between the front wheels/tires and the rear wheels/tires regardless of whether the haulage/dump truck is carrying a load or is not carrying a load.

Thus, while the foregoing body of prior art indicates it to be well known to use haulage/dump trucks, the prior art described above does not teach or suggest a haulage/dump truck which has the following combination of desirable features: (1) does not need to utilize a conventional haulage cycle; (2) provides that the orientation of the driver remains constant as the haulage/dump truck moves through its respective haulage cycle; (3) provides a bi-directional truck which does not longitudinally translate an operator's cab from the front to the back of the truck; (4) provides that the orientation of the driver remains constant as the haulage/dump truck moves through an unconventional haulage cycle; (5) provides a haulage/dump truck in which an operator's cab can be selectively positioned along a transverse axis that is perpendicular to the longitudinal axis of the truck; (6) provides a haulage/dump truck which reduces "blind spots" without requiring the use of a plurality of mirrors; (7) provides a vector neutral truck that utilizes well known and readily available power plants, transmissions, suspensions, wheel assemblies, steering systems, braking systems, and dumping systems; (8) travels a shorter distance from the load station to the dump station during its haulage cycle; (9) employs fewer brake and steering actuations during its haulage cycle; (10) is easier to automate than a conventional haulage/dump truck; (11) is easier to adapt for remote control operation than a conventional haulage/dump truck; (12) provides a substantially 50%—50% relative weight distribution between the front wheels/tires and the rear wheels/tires regardless of whether the haulage/dump truck is carrying a load or is not carrying a load.

The foregoing desired characteristics are provided by the unique vector neutral truck of the present invention as will be made apparent from the following description thereof. Other advantages of the present invention over the prior art also will be rendered evident.

SUMMARY OF THE INVENTION

To achieve the foregoing and other advantages, the present invention, briefly described, provides a self-propelled vehicle which includes a main frame which includes a main-frame longitudinal axis. A first wheel/suspension assembly is connected to the main frame near a first end of the main frame. A second wheel/suspension assembly is connected to the main frame near a second end of the main frame. A power plant is supported by the main frame. Power transmission means are connected to the power plant for transmitting power from the power plant to the first wheel/suspension assembly or to the second wheel/suspension assembly. A steering system is connected to the first wheel/suspension assembly and the second wheel/suspension assembly. The steering system includes a steering controller which turns the first wheel/suspension assembly and the second wheel/suspension assembly simultaneously. The first wheel/suspension assembly and the second wheel/suspension assembly are simultaneously turned in opposite directions. A dump box and dump box hoist mechanism are supported by the main frame, and an operator's cab is supported by the main frame along a transverse cab axis at a substantially constant longitudinal position along the main frame. The transverse cab axis is substantially perpendicular to the main-frame longitudinal axis, and the steering controller is located inside the operator's cab. Preferably, the steering controller is hand-operated.

The dump box is generally used for receiving, transporting, and unloading a variety of materials which often includes sand, gravel, rocks, aggregate, and other materials.

Preferably, an image-reception-based pathway monitoring system includes multiple image receivers and multiple viewing screens for monitoring the multiple image receivers. The multiple viewing screens are located inside the operator's cab. The multiple viewing screens are positioned in the operator's cab such that an operator need not change one's directional orientation when the vehicle moves in opposite directions.

Preferably, the image-reception-based pathway monitoring system includes image receivers that view blind spots near the vehicle that are not directly visible by the operator inside the operator's cab. Also, preferably, the image-reception-based pathway monitoring system includes image receivers that view areas near the vehicle that are would be visible by the operator in the operator's cab if the operator turned his head so as to face such viewable areas.

With one embodiment, the image-reception-based pathway monitoring system is comprised of a television-based pathway monitoring system, and the multiple image receivers include a camera cluster. In this respect, the television-based pathway monitoring system includes a camera cluster and multiple viewing screens for monitoring the camera cluster. The cameras of the camera cluster view areas outside of the operator's cab, and the multiple viewing screens are located inside the operator's cab. Preferably, the multiple viewing screens are positioned in the operator's cab such that an operator need not change one's directional orientation when the vehicle moves in opposite directions.

Preferably, the television-based pathway monitoring system includes cameras that view blind spots near the vehicle that are not directly visible by the operator inside the operator's cab. In addition, preferably, the television-based pathway monitoring system includes cameras that view areas near the vehicle that are visible or would be visible by the operator in the operator's cab if the operator turned his head so as to face such viewable areas.

If desired, the image-reception-based pathway monitoring system and the multiple image receivers could also include light driven systems and related components, such as in fiber-optic and night vision systems.

When the operator sits in the operator's cab, the operator can face either inward, toward the main-frame longitudinal axis, or outward, away from the main-frame longitudinal axis. Preferably, the operator sits in the operator's cab and faces inward toward the main-frame longitudinal axis along the transverse cab axis. Preferably, the multiple viewing screens that exhibit both blind spots and directly viewable areas are readily viewed by the operator as the operator faces inward along the transverse cab axis. Alternatively, the multiple viewing screens that exhibit both blind spots and directly viewable areas can be readily viewed by the operator as the operator faces outward along the transverse cab axis. Preferably, the hand-operated steering controller is located in front of the operator along the transverse cab axis. Preferably, the operator's cab is located at a medial position on the main frame.

Preferably, the power transmission means transmit power from the power plant to both the first wheel/suspension assembly and the second wheel/suspension assembly simultaneously.

The operator's cab is located on the transverse cab axis at a selected location either on one side of the main-frame longitudinal axis or the opposite side of the main-frame longitudinal axis. Preferably, the operator's cab is located on the transverse cab axis selectively on one side of the main-frame longitudinal axis, and a hydraulic fluid module is located on the transverse cab axis selectively on an opposite side of the main-frame longitudinal axis.

The power transmission means can include a mechanical transmission between the power plant and the first and second wheel/suspension assemblies. Alternatively, the power transmission means can includes a plurality of electric motors associated with the wheel/suspension assemblies that are powered by a generator that is driven by the power plant. In this respect, the power transmission means can be in the form of a diesel-electric power transmission system such as commonly employed with diesel-electric railroad engines.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a number of preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vector neutral truck which has all of the advantages of the prior art and none of the disadvantages.

It is a further object of the present invention to provide a new and improved vector neutral truck which is of durable and reliable construction.

Still yet a further object of the present invention is to provide a new and improved vector neutral truck which does not need to utilize a conventional haulage cycle.

Still another object of the present invention is to provide a new and improved vector neutral truck that provides that the orientation of the driver remains constant as the haulage/dump truck moves through its respective haulage cycle.

Yet another object of the present invention is to provide a new and improved vector neutral truck which provides a bi-directional truck which does not longitudinally translate an operator's cab from the front to the back of the truck.

Even another object of the present invention is to provide a new and improved vector neutral truck that provides that the orientation of the driver remains constant as the haulage/dump truck moves through an unconventional haulage cycle.

Still a further object of the present invention is to provide a new and improved vector neutral truck which provides a haulage/dump truck in which an operator's cab can be selectively positioned along a transverse axis that is perpendicular to the longitudinal axis of the truck.

Yet another object of the present invention is to provide a new and improved vector neutral truck that provides a haulage/dump truck which reduces "blind spots" without requiring the use of a plurality of mirrors.

Still another object of the present invention is to provide a new and improved vector neutral truck which provides a vector neutral truck that utilizes well known and readily available power plants, transmissions, suspensions, wheel assemblies, steering systems, braking systems, and dumping systems.

Yet another object of the present invention is to provide a new and improved vector neutral truck that travels a shorter distance from the load station to the dump station during its haulage cycle.

Still a further object of the present invention is to provide a new and improved vector neutral truck that employs fewer brake and steering actuations during its haulage cycle.

Yet another object of the present invention is to provide a new and improved vector neutral truck which is easier to automate than a conventional haulage/dump truck.

Still a further object of the present invention is to provide a new and improved vector neutral truck that is easier to adapt for remote control operation than a conventional haulage/dump truck.

Yet another object of the present invention is to provide a new and improved vector neutral truck which provides a substantially 50%—50% relative weight distribution between the front wheels/tires and the rear wheels/tires regardless of whether the haulage/dump truck is carrying a load or is not carrying a load.

These together with-still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1B includes overall dimensions and illustrates respective top, side, and rear views of another PRIOR ART modern day off-road haulage vehicle, which is a Terex TR-60 dump truck.

FIG. 2A illustrates PRIOR ART distances and times for haulage cycles, including 180 degree turns, for the conventional Liebherr T282 dump truck.

FIG. 2B illustrates PRIOR ART distances and times for haulage cycles, including 180 degree turns, for the conventional Terex TR-60 dump truck.

FIG. 3A includes overall dimensions and illustrates several views of a 400 ton vector neutral off-road haulage vehicle of the invention, wherein the illustrated views, starting at the top of FIG. 3A and going clockwise are, respectively, a top view, a level end view, a side view, and a canted end view.

FIG. 3B includes overall dimensions and illustrates several views of a 60 ton vector neutral off-road haulage vehicle of the invention, wherein the illustrated views, starting at the top of FIG. 3B and going clockwise are, respectively, a top view, a level end view, a side view, and a canted end view.

FIG. 4B illustrates distances along with load and unload positioning times for haulage cycles using the vector neutral 60 ton vehicle of the invention.

DESCRIPTION OF THE PREFERRED EMBODIMENT

With reference to the drawings, a new and improved vector neutral truck embodying the principles and concepts of the present invention will be described.

Figure 21:
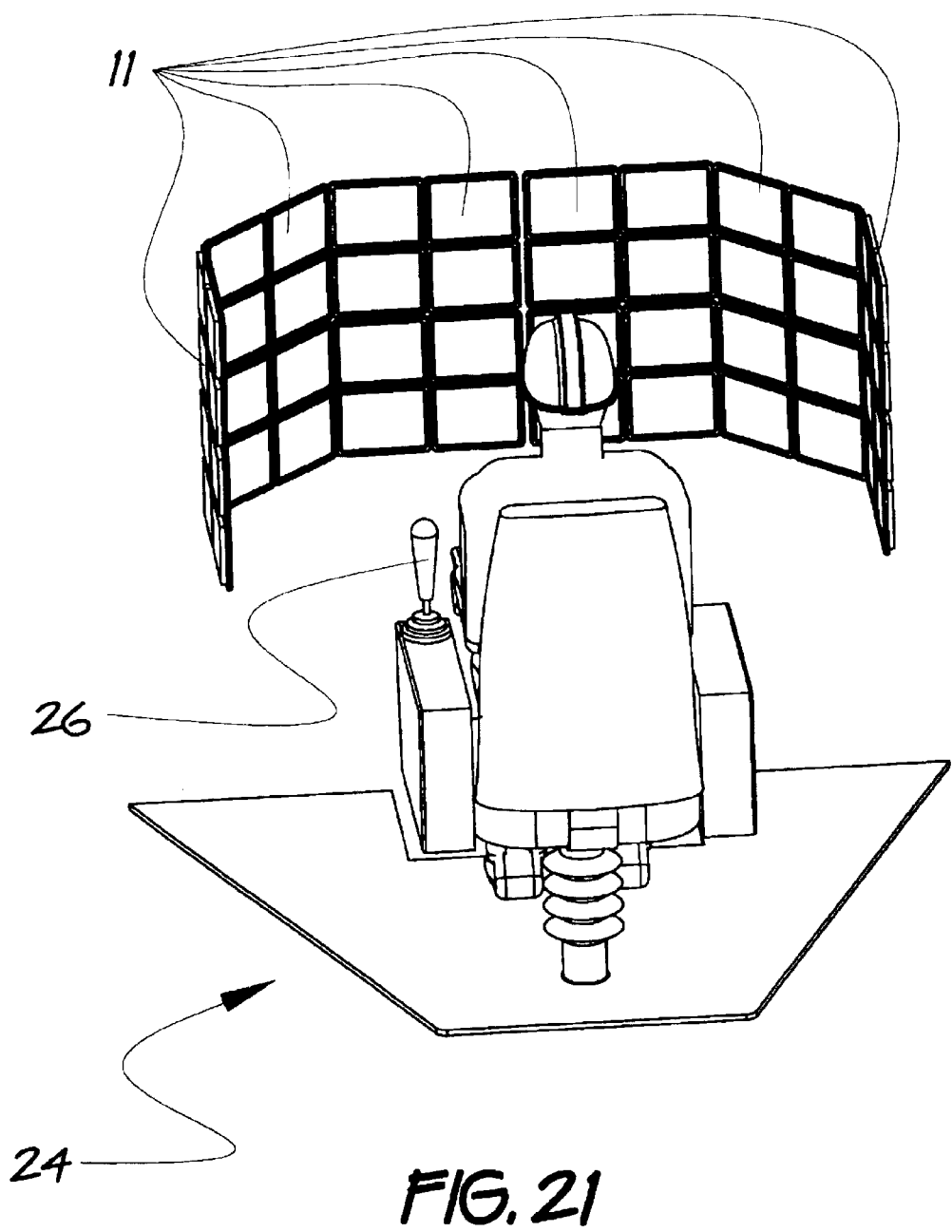
FIG. 21 is a schematic diagram of an interior portion of an operator's cab which includes multiple viewing screens and a hand-held steering controller.

Turning to the drawing figures, especially FIGS. 3A, 3B, and 6–21, there are shown a number of embodiments of the vector neutral truck of the invention. More specifically, a self-propelled vehicle 20 includes a main frame 2 which includes a main-frame longitudinal axis 21 (see FIGS. 8–12). A first wheel/suspension assembly 14 is connected to the main frame 2 near a first end of the main frame 2. A second wheel/suspension assembly 16 is connected to the main frame 2 near a second end of the main frame 2. A power plant 5 is supported by the main frame 2. Power transmission means are connected to the power plant 5 for transmitting power from the power plant 5 to the first wheel/suspension assembly 14 or to the second wheel/suspension assembly 16. A steering system is connected to the first wheel/suspension assembly 14 and the second wheel/suspension assembly 16. The steering system includes a steering controller 26 (see FIG. 21) which turns the first wheel/suspension assembly 14 and the second wheel/suspension assembly 16 simultaneously. The first wheel/suspension assembly 14 and the second wheel/suspension assembly 16 are simultaneously turned in opposite directions. A dump box 12 and dump box hoist mechanism 9 are supported by the main frame 2, and an operator's cab 24 is supported by the main frame 2 along a transverse cab axis 25 at a substantially constant longitudinal position along the main frame 2. The transverse cab axis 25 is substantially perpendicular to the main-frame longitudinal axis 21, and the steering controller 26 is located inside the operator's cab 24. Preferably, the steering controller 26 is hand-operated.

The dump box 12 is generally used for receiving, transporting, and unloading a variety of materials which often includes sand, gravel, rocks, aggregate, and other materials.

An image-reception-based pathway monitoring system includes multiple image receivers and multiple viewing screens for monitoring the multiple image receivers. The multiple viewing screens are located inside the operator's cab. The multiple viewing screens are positioned in the operator's cab such that an operator need not change one's directional orientation when the vehicle moves in opposite directions.

With one embodiment, the image-reception-based pathway monitoring system is comprised of a television-based pathway monitoring system, and the multiple image receivers include a camera cluster. More specifically, a television-based pathway monitoring system includes a camera cluster 10 and multiple viewing screens 11 for monitoring the camera cluster 10. The cameras of the camera cluster 10 (see FIGS. 6 and 7) view areas outside of the operator's cab 24, and the multiple viewing screens 11 (see FIG. 21 especially) are located inside the operator's cab 24. The multiple viewing screens 11 are positioned in the operator's cab 24 such that an operator need not change one's directional orientation when the vehicle moves in opposite directions.

Preferably, the television-based pathway monitoring system includes cameras that view blind spots near the vehicle that are not directly visible by the operator inside the operator's cab 24. In addition, preferably, the television-based pathway monitoring system includes cameras that view areas near the vehicle that are would be visible by the operator in the operator's cab 24 if the operator turned his head so as to face such viewable areas.

When the operator sits in the operator's cab 24, the operator can face either inward, toward the main-frame longitudinal axis 21, or outward, away from the main-frame longitudinal axis 21. Preferably, the operator sits in the operator's cab 24 and faces inward toward the main-frame longitudinal axis 21 along the transverse cab axis 25. Preferably, the multiple viewing screens 11 that exhibit both blind spots and directly viewable areas are readily viewed by the operator as the operator faces inward along the transverse cab axis 25. The hand-operated steering controller 26 can be located in front of the operator along the transverse cab axis 25 or can be located to the side of the operator. Preferably, the operator's cab 24 is located at a medial position on the main frame 2.

Preferably, the power transmission means transmit power from the power plant 5 to both the first wheel/suspension assembly 14 and the second wheel/suspension assembly 16 simultaneously.

The operator's cab 24 is located on the transverse cab axis 25 at a selected location either on one side of the main-frame longitudinal axis 21 or the opposite side of the main-frame longitudinal axis 21, to suit a given haulage route. If desired, a second operator's cab could be added to provide an easily translatable operator's position with respect to the side of the apparatus in which the operator is located.

The position of hydraulic and fluid modules can be what ever is optimum from a size and weight perspective and can vary according to vehicle size. In this respect, the fluid module could be located on the same side as the operator's cab if the vehicle is large enough to allow this. As shown in the drawing figures, preferably, the operator's cab 24 is located on the transverse cab axis 25 selectively on one side of the main-frame longitudinal axis 21, and a hydraulic fluid module 4 is located on the transverse cab axis 25 selectively on an opposite side of the main-frame longitudinal axis 21.

The power transmission means can include a mechanical transmission between the power plant 5 and the first and second wheel/suspension assemblies. The mechanical transmission includes drive shafts 36 and axles 6 such as shown in FIGS. 8–12.

Alternatively, the power transmission means can include a plurality of electric motors associated with the wheel/suspension assemblies that are powered by a generator that is driven by the power plant 5. In this respect, the power transmission means can be in the form of a diesel-electric power transmission system such as commonly employed with diesel-electric railroad engines.

The vector neutral trucks of the invention have the same power plants 5 as the conventional trucks. Preferably, the power plant 5 is mounted midships in the main frame 2. The power plant 5 can drive two drive shafts 36 driving two axles 6 of the first wheel/suspension assembly 14 and the second wheel/suspension assembly 16 through a mechanical transmission. Alternatively, each of the first wheel/suspension assembly 14 and the second wheel/suspension assembly 16 can include electric wheel motors. Each of the two axles 6 has four tires which carry 50% of the total weights each, both when the vehicle is empty, and when it is fully loaded.

The suspension members for the two axles are representative of the same type of suspension components found on the rear suspension of the conventional trucks e.g. a three bar linkage that is suspended on nitrogen/oil cylinders. These suspension members are fixed to a slew bearing that allows rotation of the axle and suspension about a vertical centerline. Rotating the axles equally and opposite to each other on the slew bearings steers the truck. A horizontal pivot has been added to one of the two axles to accommodate roadway irregularities without transferring torsion loads into the main frame 2.

The driver sits in an operator's cab 24 which is midships facing in a direction that is perpendicular to the line of travel (that is perpendicular to the main-frame longitudinal axis 21). Preferably, the driver faces perpendicularly toward the mainframe longitudinal axis 21. Alternatively, the driver can face perpendicularly away from the main-frame longitudinal axis 21. The driver watches a multiple viewing screen display 11 that is fed by multiple redundant cameras 10 to produce a virtual view of the vehicle's travel path. The payload is deposited into a dump bucket 12 that is hinged on the main frame 2 to discharge the load.

There is no differentiation in driver control and operation of the vehicle with reference to the direction of travel, hence its name "Vector Neutral". Because there is no operational difference in performance as direction changes, there is no need to turn the vehicle around to change direction. Also, there is no need for the operator to reorient his driving position, whether the truck is moving forward or backward.

Clearly, the features provided by the vector neutral truck of the invention change the conventional haul cycle of a conventional haulage/dump truck. Because power plants 5, drive trains, and tires are the same as conventional trucks, performance in the "to and from" sections of the novel haulage cycle are equal. However, the turn-around and reverse-into position sections of the conventional haul cycle are eliminated from the haulage cycle of the vector neutral truck. The result is an undisputable advantage over the conventional haulage cycle.

There are many more benefits flowing from the vector neutral truck's haul cycle other than that of a straight time and distance advantage. Fewer brake and steering applications mean reduced wear on the entire drive train, including tires. Also, less road maintenance is required because of the elimination of the turn-around area. In addition, vector neutral truck of the invention facilitates and simplifies adapting remote and automated vehicle control to the truck.

Two models of the vector neutral truck embodiment of the invention of the invention are illustrated in the drawings. The two illustrated models of the vector neutral truck are dimensionally correct and are made up of representative components found in common conventional machinery. There is no new technology needed to build the vector neutral truck. The novelty and innovation comes from the arrangement and combination of the components and their interaction.

A 60-ton vector neutral truck is illustrated in FIGS. 3B, 5B, 13, 14, 15, and 16. For the 60-ton vector neutral truck, a 650 hp power plant drives through a mechanical transmission, transfer case, and drive shafts to two axles with four tires each. The fully enclosed operator's compartment 24 is located midships. The overall dimensions for the 60-ton vector neutral truck are: length is 10.6 m (34'-10"); width is 5.2 m (17'-2"); height is 3.9 m (12'-10") with an outside turning radius of 9.8 m (32'-2"). The dump box 12 has a heaped capacity of 35 cubic meters (46 yrd$^3$) and is hinged on the main frame 2. It is noted that this model has eight tires equally sharing the same payload and similar vehicle weight, carried by only six tires on a conventional truck. This means either smaller tires can be employed, or a larger payload can be carried when compared to the same sized conventional truck. Assuming a deceleration rate of 0.08 g empty and loaded, the distance and time needed to position the vector neutral truck for loading and dumping starting from a speed of 12.8 km/h (8 mph) empty, and 8 km/h (5 mph) loaded is shown in FIG. 4b.

Figure 4A:
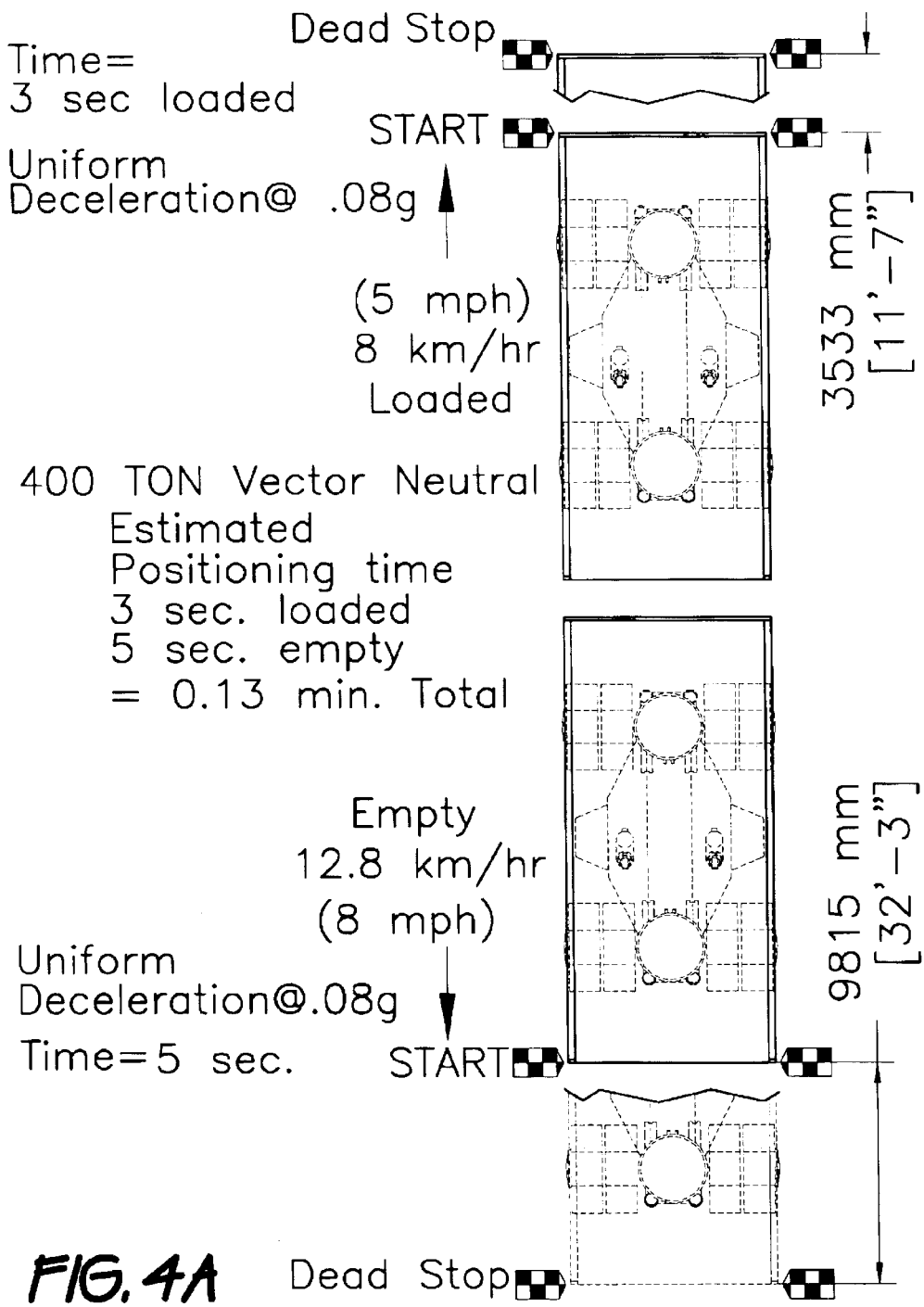
FIG. 4A illustrates distances along with load and unload positioning times for haulage cycles using the vector neutral 400 ton vehicle of the invention.

A 400-ton vector neutral truck is illustrated in FIGS. 5A and 17–20. For the 400-ton vector neutral truck, a 2700 hp power plant drives through an electrical drive system to two axles with four tires each. The fully enclosed operator's compartment 24 is located midships. The overall dimensions for the 400-ton vector neutral truck are: length is 19.9 m (65'-4"); width is 9.1 m (30'-0"); height is 7.5 m (24'-7") with an outside turning radius of 17 m (56'-0"). The dump box 12 has a heaped capacity of 183 cubic meters (240 yrd$^3$) and is hinged on the main frame 2. Assuming a deceleration rate of 0.08 g empty and loaded the distance and time needed to position the vector neutral truck for loading and dumping, starting from a speed of 12.8 km/h (8 mph) empty and 8 km/h (5 mph) loaded is shown in FIG. 4A.

Figure 1A:
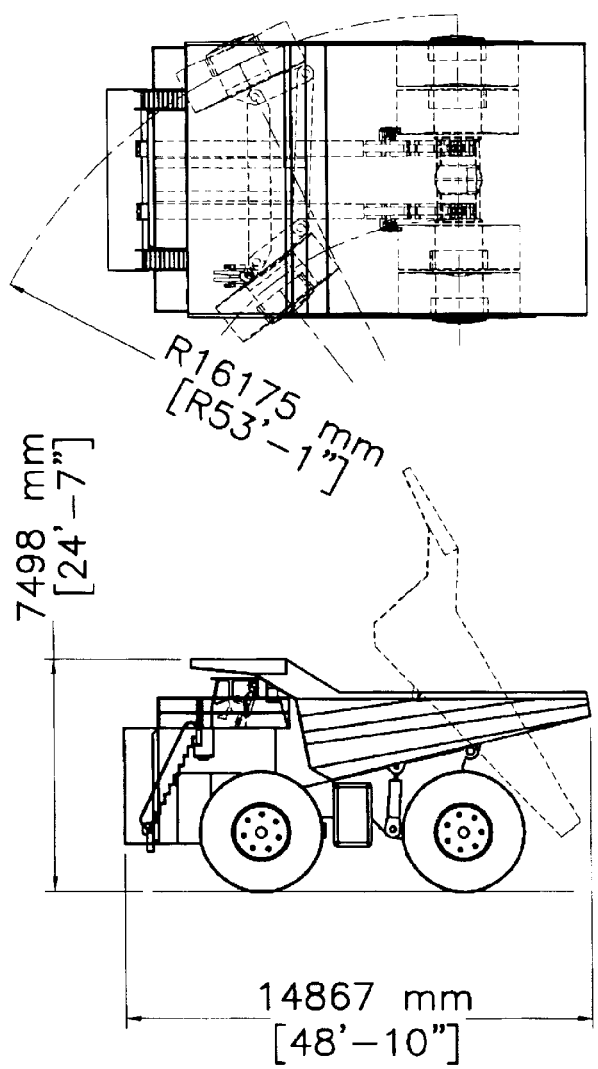
FIG. 1A includes overall dimensions and illustrates respective top, side and rear views of one PRIOR ART modern day off-road haulage vehicle, which is a Liebherr T282 dump truck and wherein the three right-most views are top, side, and rear views of a Terex TR-60 dump truck.

In comparing the vector neutral trucks and the conventional trucks (Terex, 1998 in FIGS. 1B, 2B, and 5B and Liebherr, 2002 in FIGS. 1A, 2A, and 5A), the biggest differences appear in overall length. More specifically, the overall distance in length between the 400 ton vector neutral truck and the 400 ton Liebherr T282 dump truck is 5.03 m (19.90 m–14.87 m). Also, the overall distance in length between the 60 ton vector neutral truck and the Terex TR-60 dump truck is and 1.4 m (10.63 m–9.24 m). These respective length differences are caused by slightly longer wheel bases on the vector neutral trucks, and dump boxes that are longer than the respective conventional dump boxes.

Figure 5A:
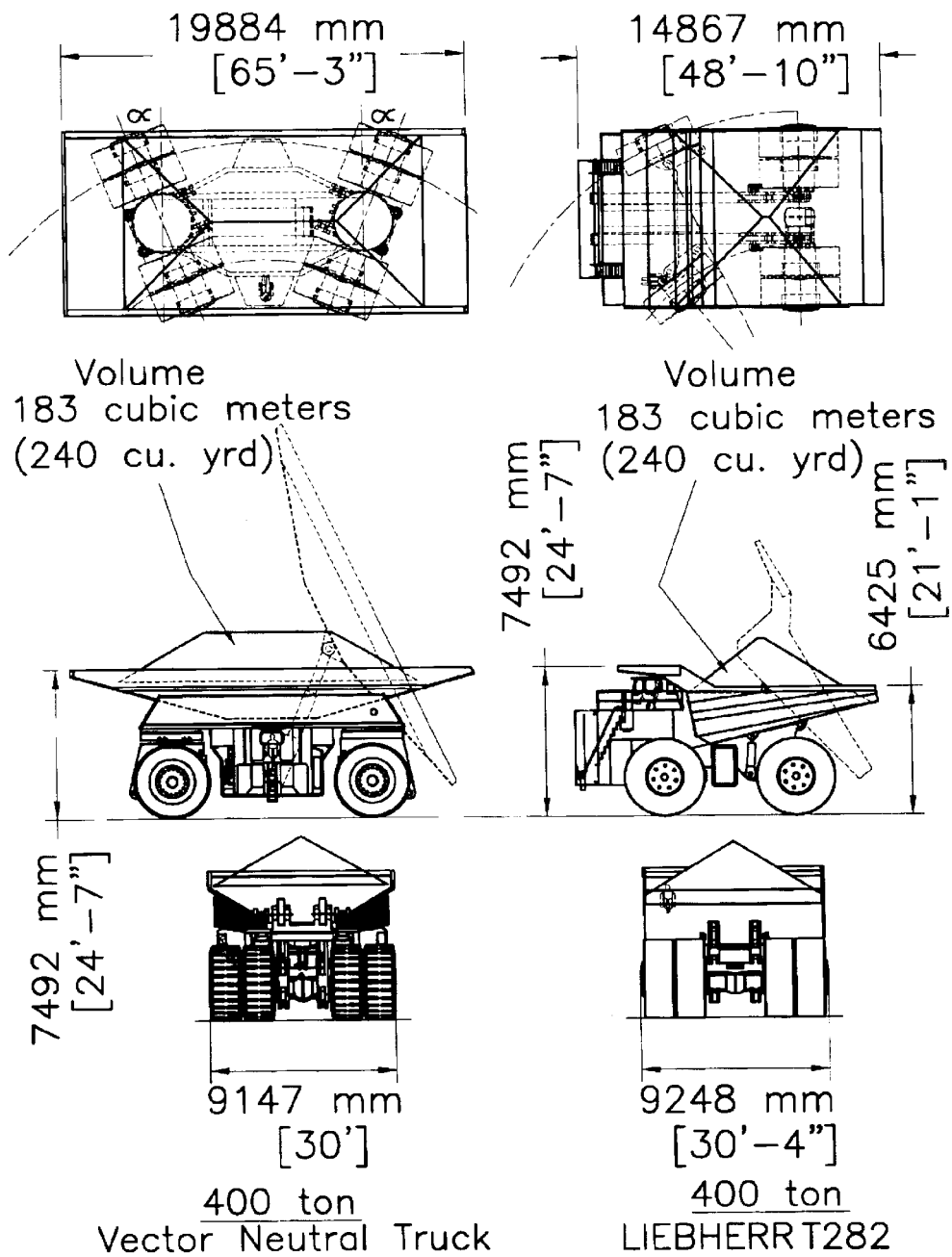
FIG. 5A illustrates dimensional comparisons of respective top, side, and rear views of a 400 ton vector neutral truck of the invention, with respective view on the left side of the figure, and a 400 ton Liebhert T282 dump truck, with respective views on the right side of the figure.

As shown in FIG. 5A, the loading height of the 400 ton vector neutral truck is 1 m higher than the conventional Liebherr T282 dump truck, but the two trucks do have the same overall height. In addition, as shown in FIG. 5B, loading heights on the 60 ton trucks differ by only 0.17 m.

Figure 5B:
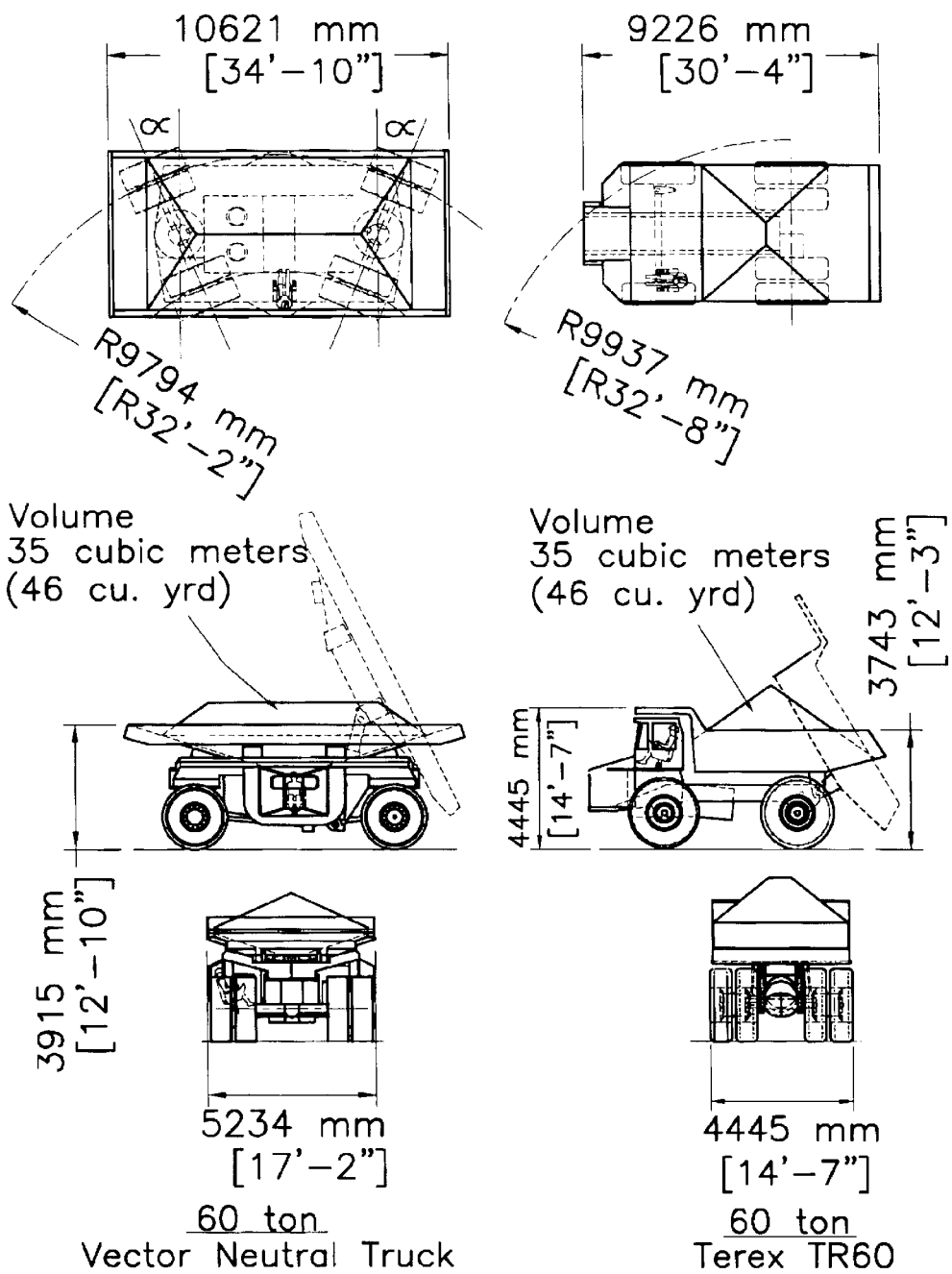
FIG. 5B illustrates dimensional comparisons of respective top, side, and rear views of a 60 ton vector neutral truck of the invention, with respective view on the left side of the figure, and a 60 ton Terex TR-60 dump truck, with respective view on the right side of the figure.
Figure 6:
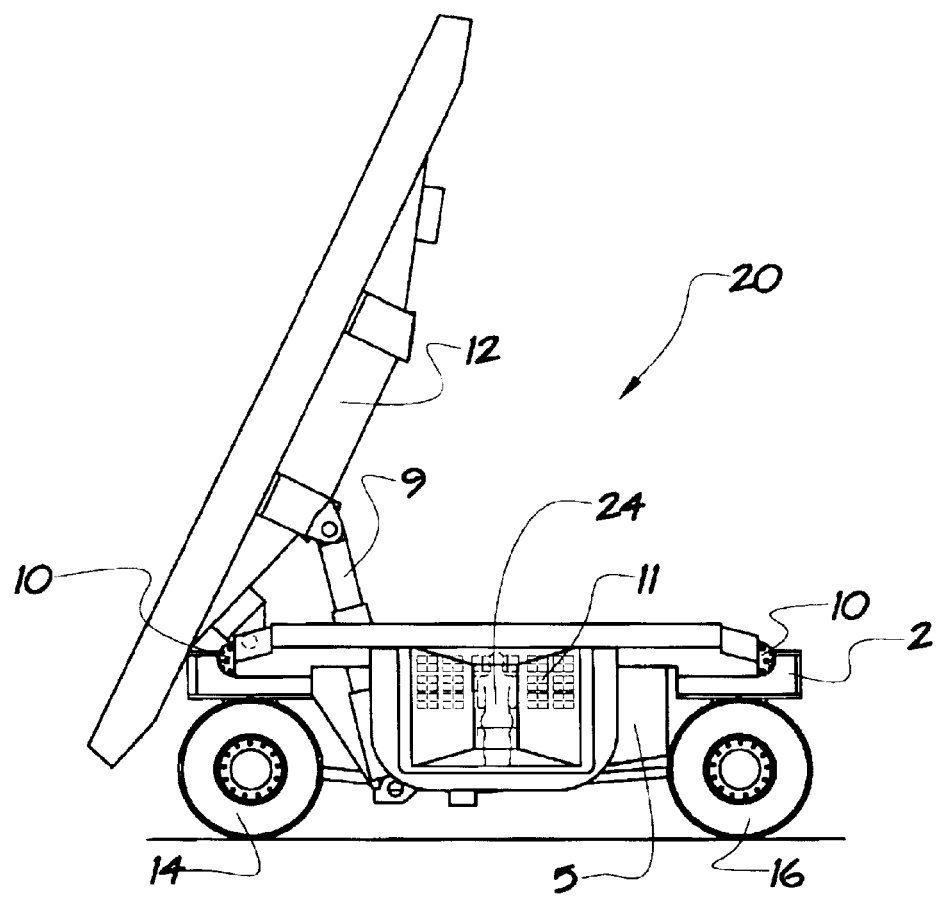
FIG. 6 discloses a side view of a vector neutral apparatus of the invention in a dumping mode.
Figure 7:
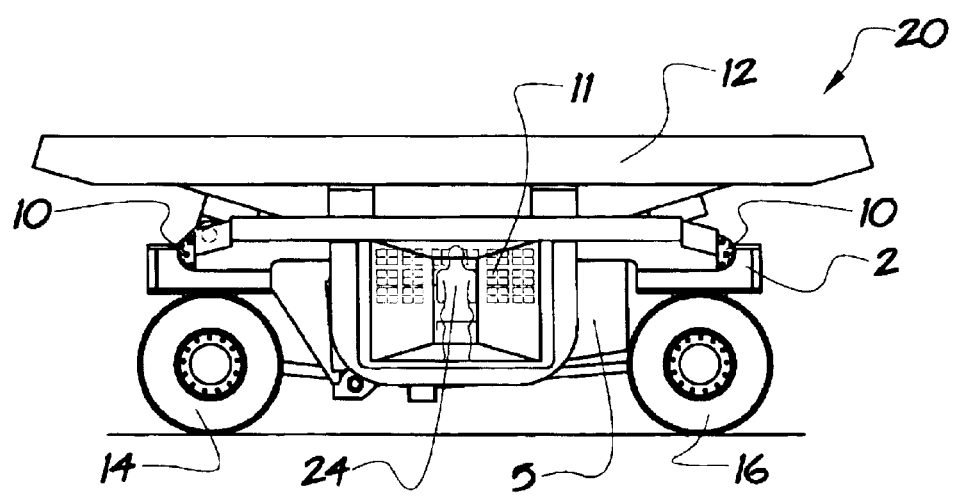
FIG. 7 discloses a side view of the apparatus of FIG. 6 in a loading and transporting mode.
Figure 8:
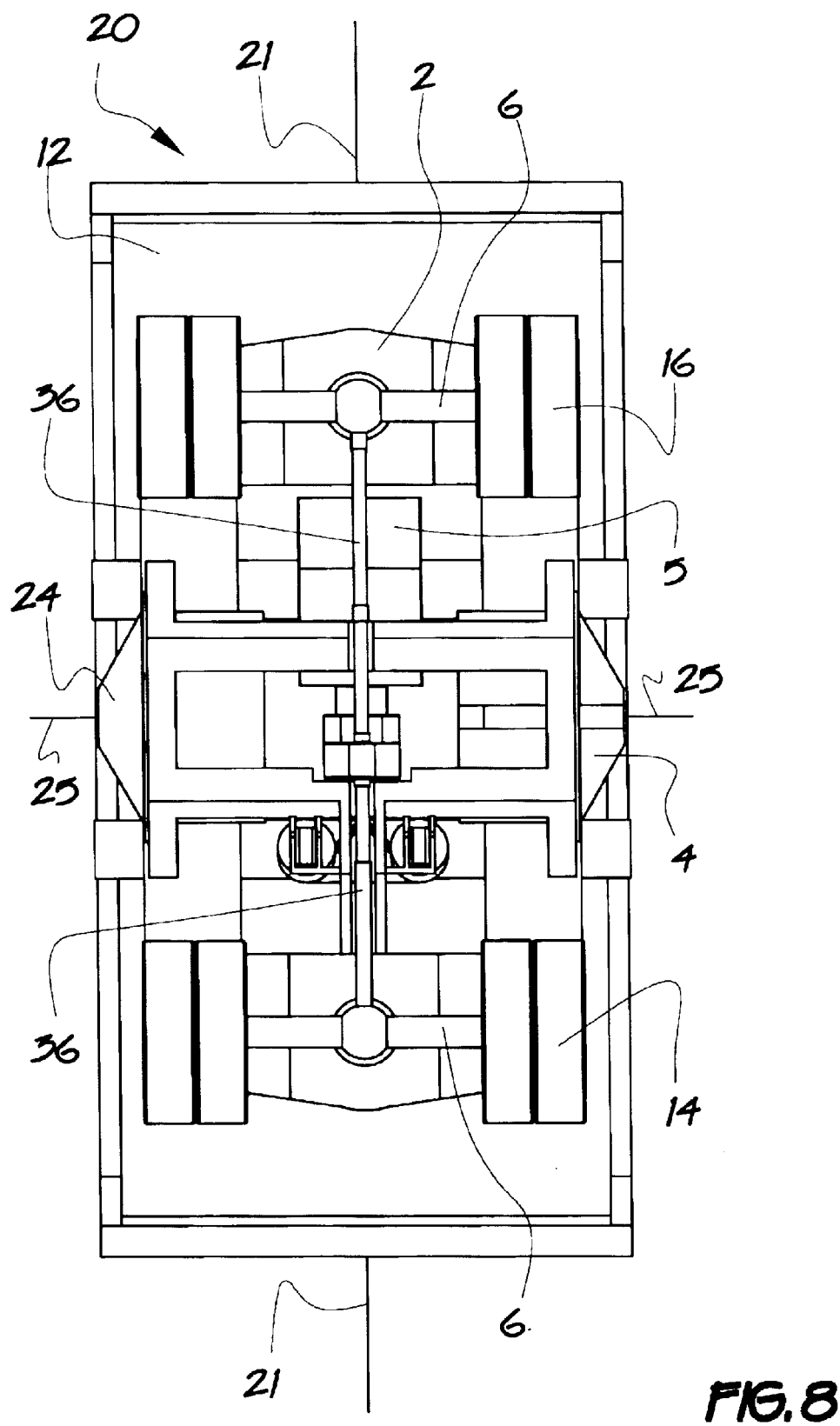
FIG. 8 is a bottom view of the embodiment of the invention shown in FIG. 7 wherein the front and rear wheels are aligned for a straight course transport.
Figure 9:
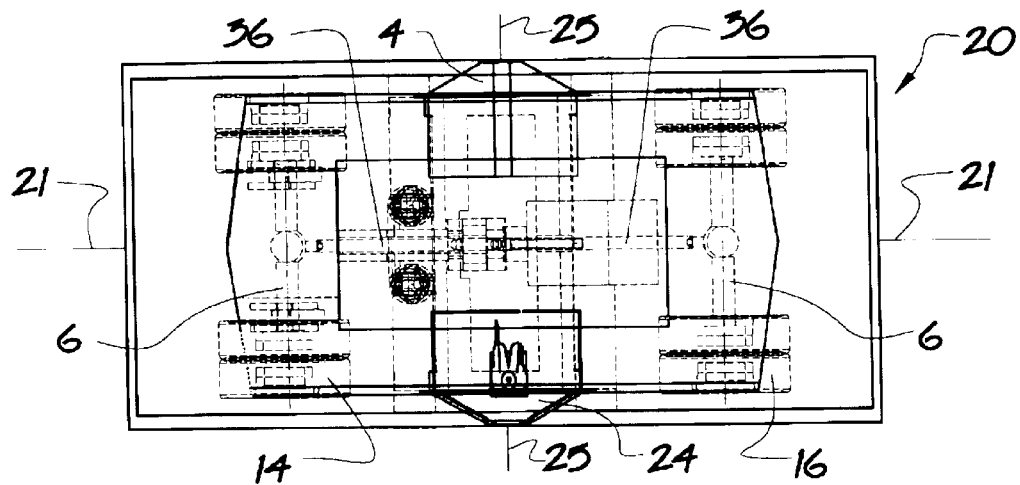
FIG. 9 illustrates an operator located on the port side of the vector neutral vehicle with the hydraulic fluid module located on the starboard side.
Figure 10:
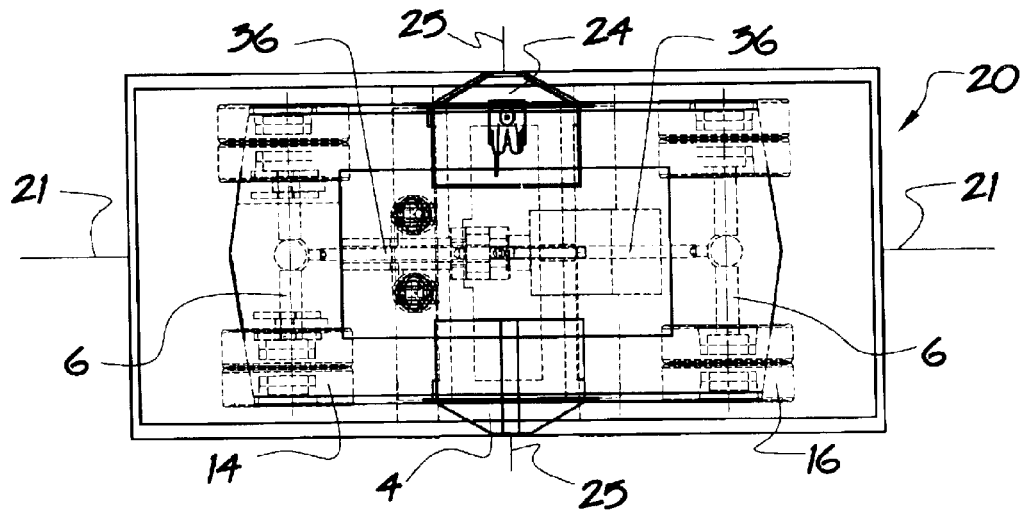
FIG. 10 illustrates the inverse of FIG. 9, that is the operator is located on the starboard side of the vector neutral vehicle, with the hydraulic fluid module located on the port side.
Figure 11:
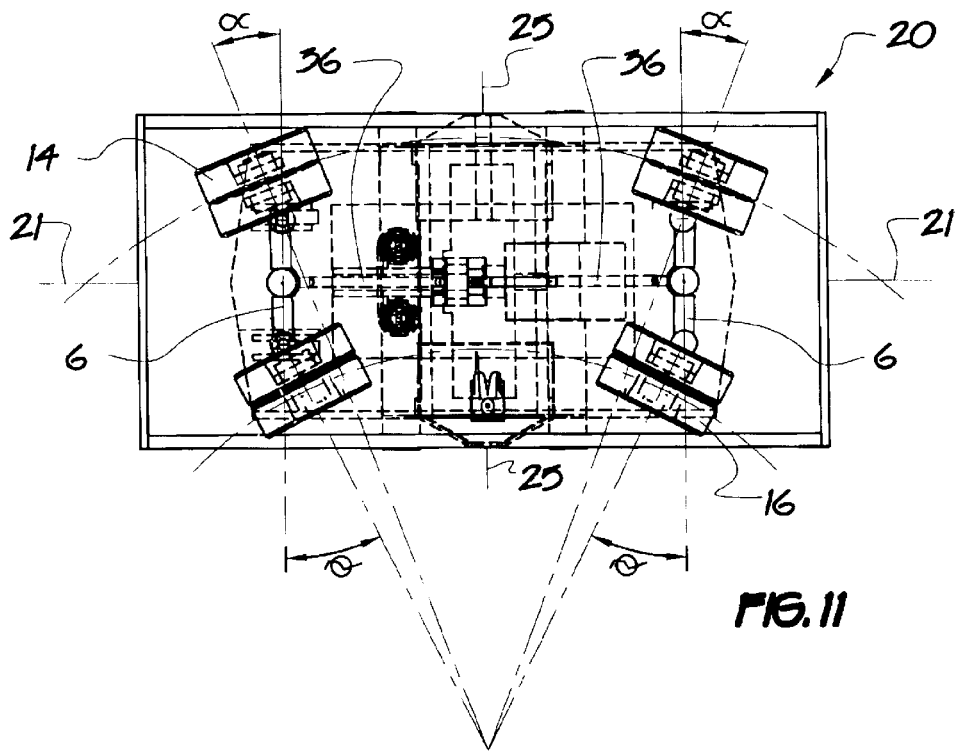
FIG. 11 illustrates a "king-pin" type axle, wherein each wheel set rotates about a vertical axis.
Figure 12:
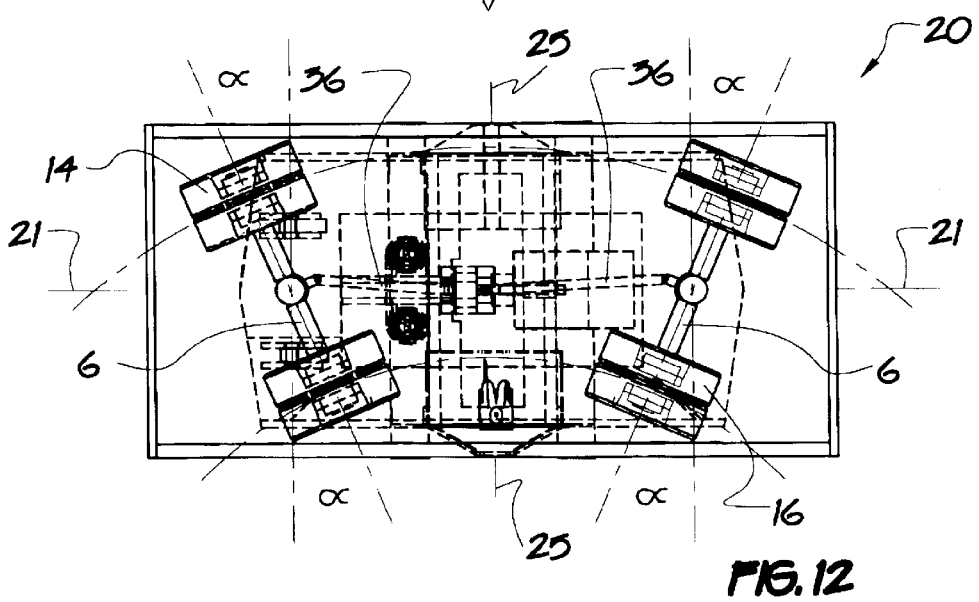
FIG. 12 illustrates a slewing axle, wherein each complete axle slews about a vertical axis.
Figure 13:
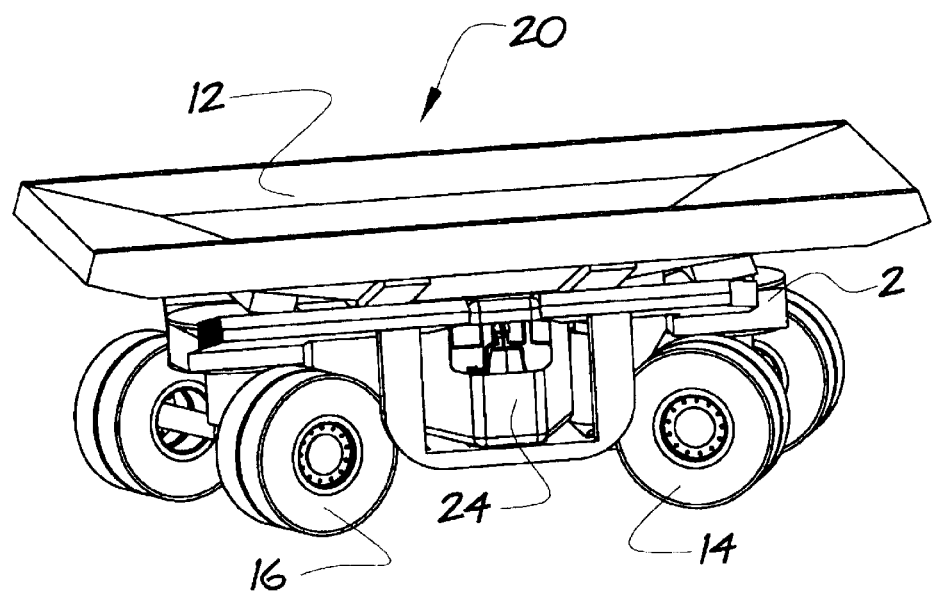
FIG. 13 is a side view showing a model of a 60 ton vector neutral truck of the invention with wheels steered in a turning orientation.
Figure 14:
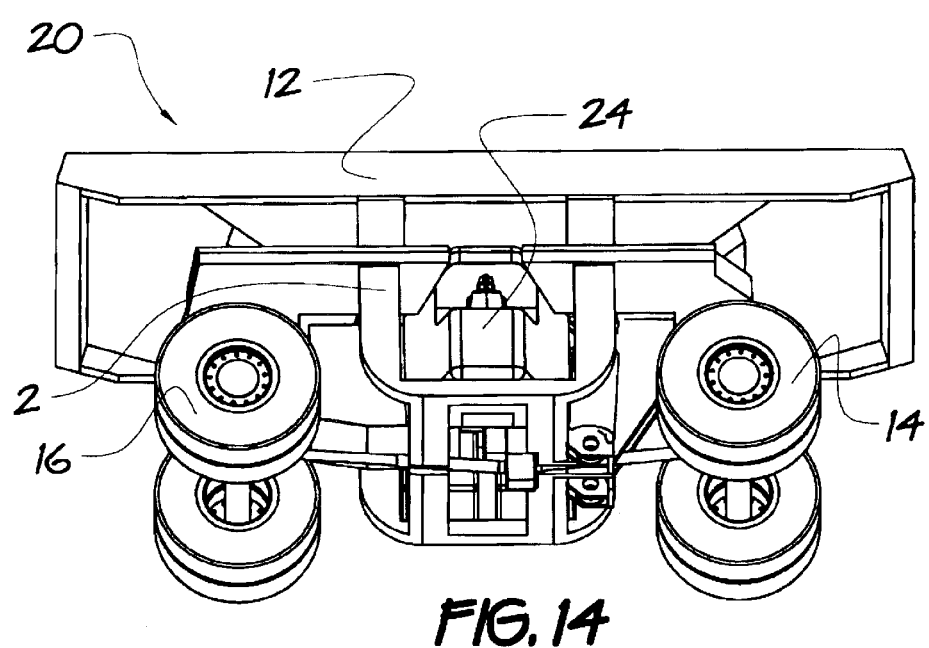
FIG. 14 is a bottom side view show a model of a 60 ton vector neutral truck of the invention with wheels in a straight line orientation.
Figure 15:
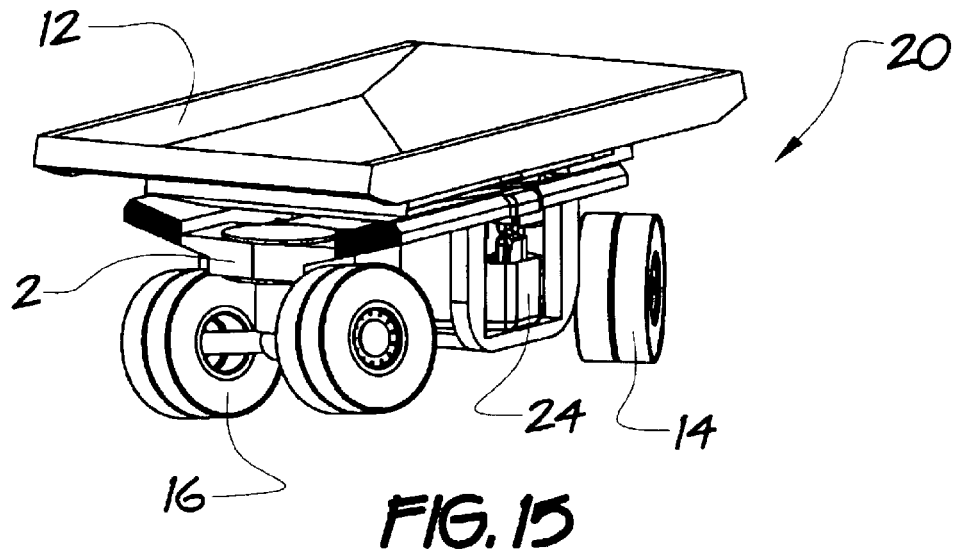
FIG. 15 is a front perspective view of a model of a 60 ton vector neutral truck of the invention with axles canted and with wheels steered in a turning orientation.
Figure 16:
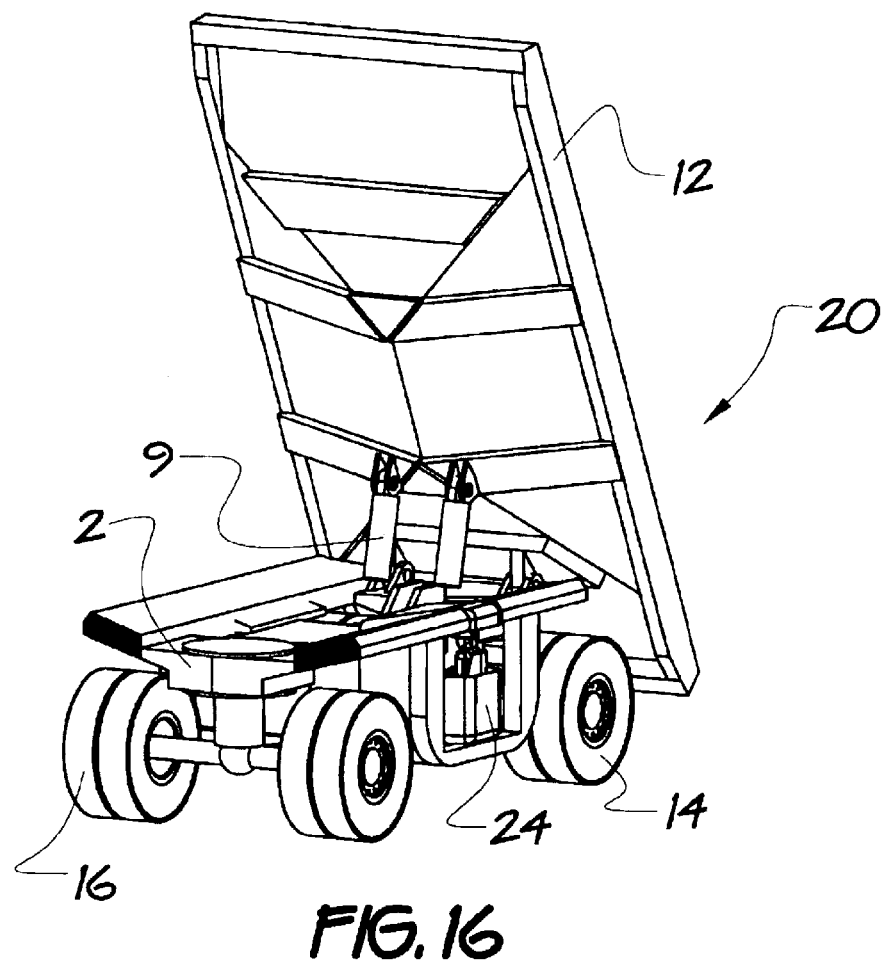
FIG. 16 is a front perspective view of a model of a 60 ton vector neutral truck of the invention in a dumping orientation.
Figure 17:
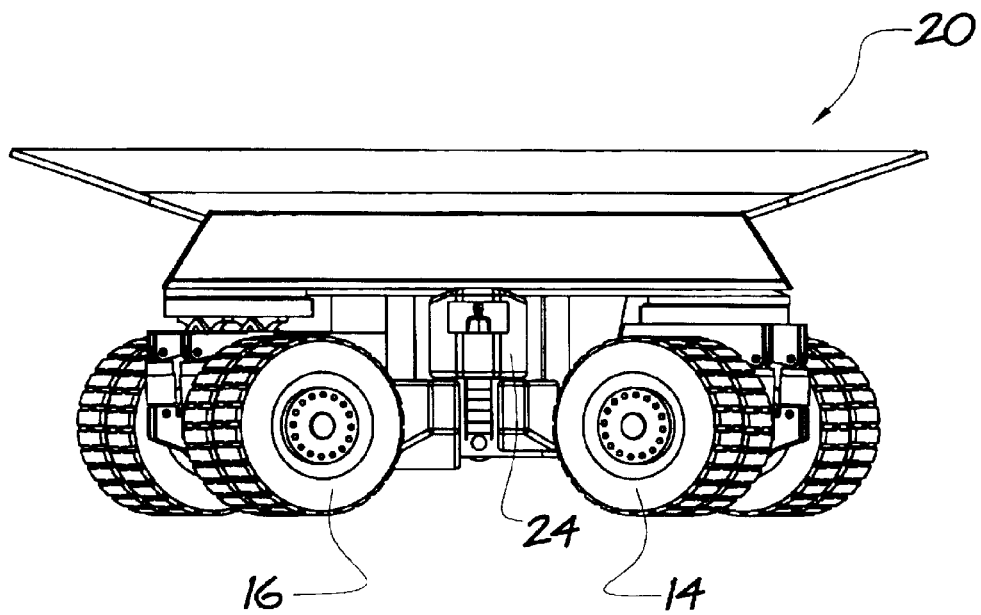
FIG. 17 is a side view showing a model of a 400 ton vector neutral truck of the invention with wheels steered in a turning orientation and showing operator's cab.
Figure 18:
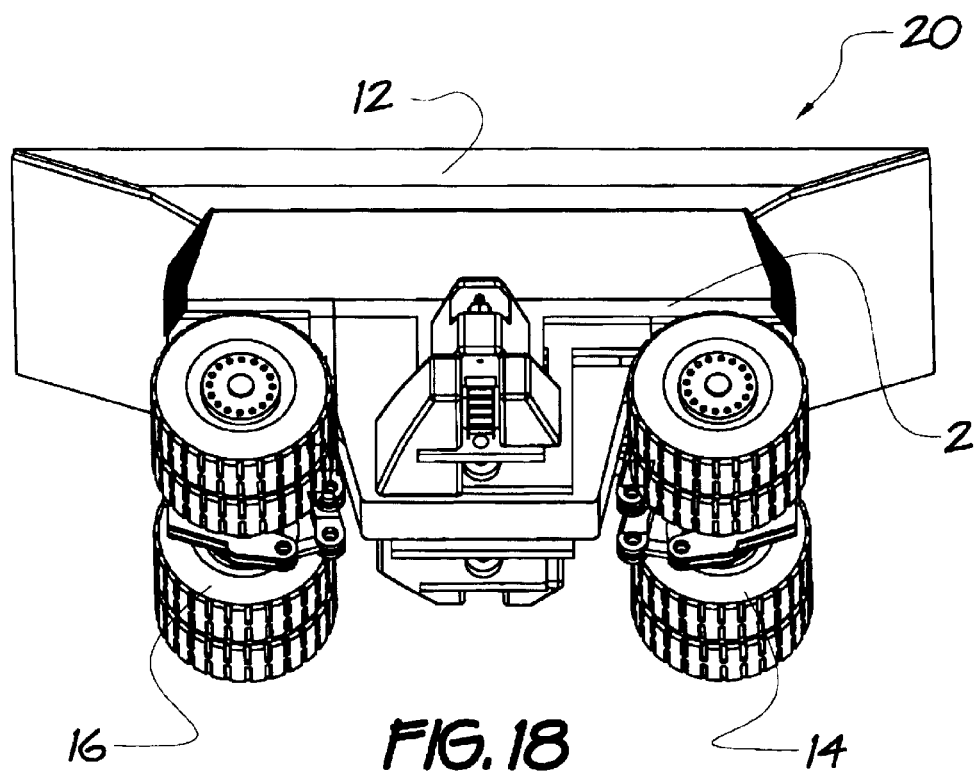
FIG. 18 is a bottom side view show a model of a 400 ton vector neutral truck of the invention with wheels in a straight line orientation.
Figure 19:
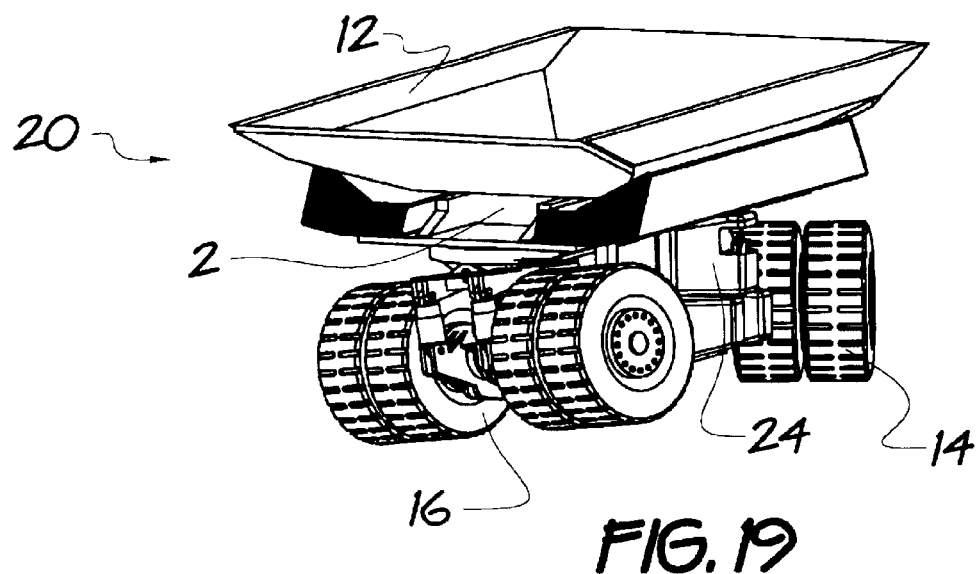
FIG. 19 is a front perspective view of a model of a 400 ton vector neutral truck of the invention with axles canted and with wheels steered in a turning orientation.
Figure 20:
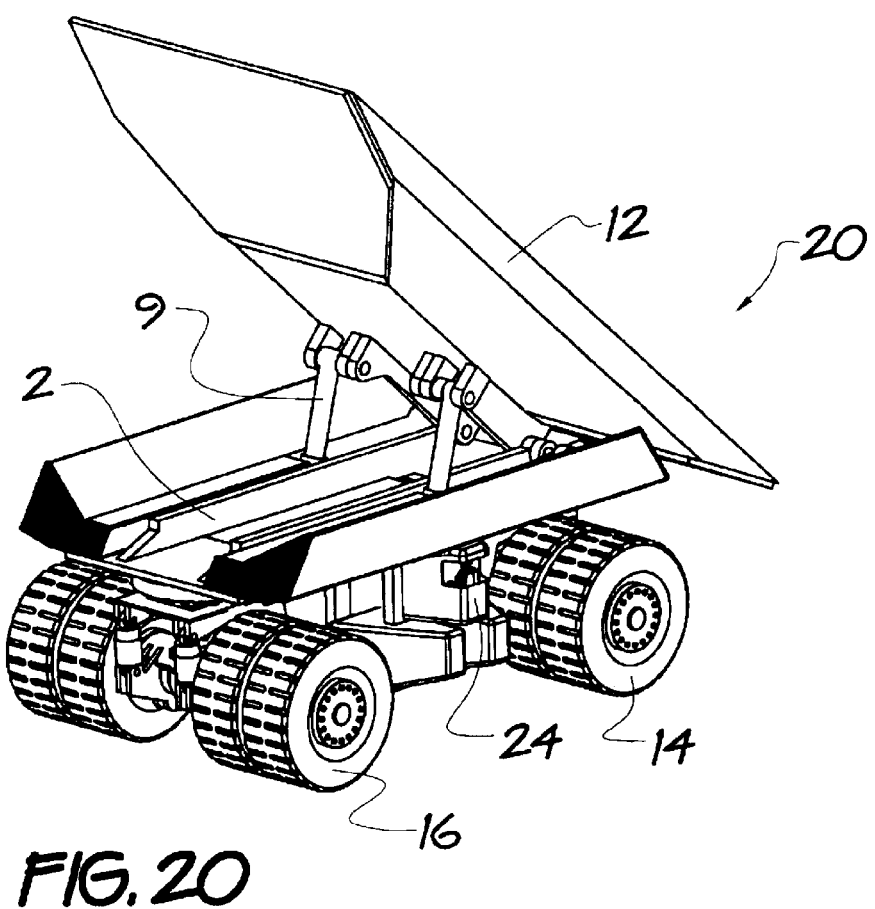
FIG. 20 is a front perspective view of a model of a 400 ton vector neutral truck of the invention in a dumping orientation.

With reference to FIGS. 5A and 5B, there are slight difference in the turning radiuses, 0.88 m for the 400 ton size trucks and 0.1 m, for the 60 ton versions. Overall road width is the same for both the 400 ton conventional truck and the 400 ton vector neutral truck. On the other hand, the illustrated 60 ton vector neutral truck is 0.75 m wider than the conventional 60 ton truck. There would also be a difference in weight between the respective vector neutral trucks and the respective conventional trucks due to the addition of two slew bearings to the major component list of the respective vector neutral trucks. However, this would be partially offset by the deletion of the King-pin and front suspensions present in the respective conventional trucks that are not needed on the vector neutral trucks.

However, as indicated above, the most important differences between the respective vector neutral trucks and the respective conventional trucks are in the respective cycle times. As roughly calculated, the 400 ton vector neutral truck will save 2.27 minutes per haulage cycle when compared to a conventional truck of the same size; that is, 2.4 minutes for the Liebherr T282 dump truck shown in FIG. 2A compared to the 0.13 minutes for the 400 ton vector neutral truck shown in FIG. 4A.

For the respective 60 ton trucks, the 60 ton vector neutral truck would outperform a conventional 60 ton Terex TR-60 dump truck by 1.47 minutes per haulage cycle; that is, 1.6 minutes for the Terex TR-60 dump truck shown in FIG. 2B compared to the 0.13 minutes for the 60 ton vector neutral truck shown in FIG. 4B.

From a physical stand point, the vector neutral truck is able to work along side conventional trucks of the same capacity, without the need of any changes to ancillary equipment or roadways. The vector neutral truck uses the same major components, i.e. engines, transmissions, tires and wheels, as conventional trucks. This means the travel to and from the loading zone and the dump zone, will be essentially the same for the vector neutral truck and a conventional truck.

The most readily perceived performance advantage of the vector neutral truck is in the time savings gained by not having to turn around and reverse direction with every haulage cycle. This is a real and undisputable performance advantage that is conservatively estimated at: 1.47 minutes per cycle for a 60 ton capacity truck, and 2.27 minutes for a 400 ton truck. To put it a different way, a 60 ton vector neutral truck would have a greater than 10% performance advantage over a conventional truck on any haulage cycle up to 14.6 minutes in length. A 400 ton vector neutral truck would have a greater than 10% performance advantage on any haulage cycle up to 22.6 minutes in length.

Moreover, with a vector neutral truck, less steering and brake actuations take place; there is less wear on the drive train; there is less scrub and wear on tires; there are no turn-around areas to maintain; and there is an ease of adapting remote and automatic control of the vehicle. Beyond these mentioned advantages of the vector neutral truck, other advantages may also be realized.

With respect to conventional components for a haulage/dump truck that can be employed with vector neutral trucks of the invention, the following references are stated to supplement the other disclosures made herein:
1. Cummins Power Generation: Specification Sheet—Generator Set Diesel 2700 hp; especially; October 2002.
2. Goodyear: Off-Roads Tires—Haulage Truck Tires; especially; October 2002.
3. Hutnyak Consulting: Haul Truck Photos; especially October 2002.
4. Liebherr: Technical Description Mining Truck T282; especially 2002.
5. Terex: TR-60 Off-Highway Truck: Specification Brochure; Form No 782, August 1998.
6. Vince's Big Trucks: Information and pictures of large haulage trucks; especially October 2002.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved vector neutral truck which does not need to utilize a conventional haulage cycle. With the invention, a vector neutral truck provides that the orientation of the driver remains constant as the haulage/dump truck moves through its respective haulage cycle. With the invention, a vector neutral truck provides a bi-directional truck which does not longitudinally translate an operator's cab from the front to the back of the truck. With the invention, a vector neutral truck provides that the orientation of the driver remains constant as the haulage/dump truck moves through an unconventional haulage cycle. With the invention, a vector neutral truck provides a haulage/dump truck in which an operator's cab can be selectively positioned along a transverse axis that is perpendicular to the longitudinal axis of the truck. With the invention, a vector neutral truck provides a haulage/dump truck which reduces "blind spots" without requiring the use of a plurality of mirrors. With the invention, a vector neutral truck provides a vector neutral truck that utilizes well known and readily available power plants, transmissions, suspensions, wheel assemblies, steering systems, braking systems, and dumping systems. With the invention, a vector neutral truck is provided which travels a shorter distance from the load station to the dump station during its haulage cycle. With the invention, a vector neutral truck is provided which employs fewer brake and steering actuations during its haulage cycle. With the invention, a vector neutral truck is provided which is easier to automate than a conventional haulage/dump truck. With the invention, a vector neutral truck is provided which is easier to adapt for remote control operation than a conventional haulage/dump truck. With the invention, a vector neutral truck provides a substantially 50%—50% relative weight distribution between the front wheels/tires and the rear wheels/tires regardless of whether the haulage/dump truck is carrying a load or is not carrying a load.

Thus, while the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationship equivalent to those illustrated in the drawings and described in the specification.

What is claimed is:

1. A self-propelled vehicle, comprising:

a main frame which includes a main-frame longitudinal axis, a first wheel/suspension assembly connected to said main frame near a first end of said main frame, a second wheel/suspension assembly connected to said main frame near a second end of said main frame, a power plant supported by said main frame, a power transmission means connected to said power plant for transmitting power from said power plant to said first wheel/suspension assembly or to said second wheel/suspension assembly, a steering system connected to said first wheel/suspension assembly and said second wheel/suspension assembly, wherein said steering system includes a steering controller which turns said first wheel/suspension assembly and said second wheel/suspension assembly simultaneously, wherein said first wheel/suspension assembly and said second wheel/suspension assembly are simultaneously turned in opposite directions, a dump box and dump box hoist mechanism supported by said main frame, and an operator's cab supported by said main frame along a transverse cab axis at a substantially constant longitudinal position along said main frame, wherein said transverse cab axis is substantially perpendicular to said main-frame longitudinal axis, and wherein said steering controller is located inside said operator's cab, and wherein said operator's cab is located at a medial position on said main frame along said main-frame longitudinal axis.

2. The self-propelled vehicle of claim 1 wherein said steering controller is hand-operated.

3. The self-propelled vehicle of claim 1 wherein said power transmission means transmit power from said power plant to both said first wheel/suspension assembly and said second wheel/suspension assembly.

4. The self-propelled vehicle of claim 1 wherein said operator's cab is located on said transverse cab axis at a selected location either on one side of said main-frame longitudinal axis or the opposite side of said main-frame longitudinal axis.

5. The self-propelled vehicle of claim 1, further including:

a hydraulic fluid module, powered by said power plant, for providing power to said dump box hoist mechanism for lifting said dump box.

6. The self-propelled vehicle of claim 5 wherein:

said operator's cab is located on said transverse cab axis selectively on one side of said main-frame longitudinal axis, and said hydraulic fluid module is located on said transverse cab axis selectively on an opposite side of said main-frame longitudinal axis.

7. The self-propelled vehicle of claim 1, further including:

an image-reception-based pathway monitoring system which includes multiple image receivers and multiple viewing screens for monitoring said multiple image receivers, wherein said multiple viewing screens are located inside said operator's cab.

8. The self-propelled vehicle of claim 7 wherein said multiple viewing screens are positioned in said operator's cab such that an operator need not change one's directional orientation when said vehicle moves in opposite directions.

9. The self-propelled vehicle of claim 7 wherein said image-reception-based pathway monitoring system includes image receivers that view blind spots near said vehicle that are not directly visible by the operator inside the operator's cab.

10. The self-propelled vehicle of claim 7 wherein said image-reception-based pathway monitoring system includes image receivers that view areas near said vehicle that are visible or would be visible by the operator in the operator's cab if the operator turned his head so as to face such viewable areas.

11. The apparatus of claim 7 wherein:

said image-reception-based pathway monitoring system is comprised of a television-based pathway monitoring system, and said multiple image receivers include a camera cluster.

* * * * *